(12) United States Patent
Tonkovich et al.

(10) Patent No.: US 6,652,627 B1
(45) Date of Patent: Nov. 25, 2003

(54) PROCESS FOR SEPARATING A FLUID COMPONENT FROM A FLUID MIXTURE USING MICROCHANNEL PROCESS TECHNOLOGY

(75) Inventors: Anna Lee Tonkovich, Marysville, OH (US); Bruce F. Monzyk, Delaware, OH (US); Dongming Qiu, Dublin, OH (US); Matthew B. Schmidt, Columbus, OH (US); G. Bradley Chadwell, Reynoldsburg, OH (US); Wesley Bruno, Dublin, OH (US); Eric Burckle, Columbus, OH (US)

(73) Assignee: Velocys, Inc., Plain City, OH (US)

(*) Notice: Subject to any disclaimer, the term of this patent is extended or adjusted under 35 U.S.C. 154(b) by 0 days.

(21) Appl. No.: 10/284,029

(22) Filed: Oct. 30, 2002

(51) Int. Cl.[7] .............................................. B01D 53/04
(52) U.S. Cl. ............................ 95/104; 95/115; 95/116; 95/138; 95/143; 95/144; 95/148
(58) Field of Search ............................ 95/96–106, 114, 95/115, 128–130, 135–141, 143, 144, 148; 96/126, 130, 131, 133, 143, 144, 146

(56) References Cited

U.S. PATENT DOCUMENTS

| 3,501,897 A | * | 3/1970 | Van Helden et al. ......... 95/137 |
| 4,516,632 A |   | 5/1985 | Swift et al. ................ 165/167 |
| 4,609,039 A | * | 9/1986 | Fushiki et al. ............... 96/126 |

(List continued on next page.)

FOREIGN PATENT DOCUMENTS

| EP | 0 597 300 B1 | 10/1993 |
| EP | 0 885 086 B1 | 8/2001 |
| WO | WO00/06295 | 2/2000 |
| WO | WO01/12312 a2 | 2/2001 |
| WO | WO01/54807 A1 | 8/2001 |
| WO | WO01/95237 A2 | 12/2001 |

OTHER PUBLICATIONS

Collman et al.; "Oxygen Binding to Iron Porphyrins"; JACS 97, 7185–6 (1975).

Institute for Micro Process Engineering; "Fast Temperature Cycling: New Opportunities for Process Engineering"; Mar. 2002.

M. Matlosz et al.; Microreaction Technolgoy; Proceedings of the Fifth International Conference on Microreaction Technology; "Microreactors as Tools in Chemical Research"; Oct. 2001.

TeGrotenhuis et al.; "Optimizing Microchannel Reactors by Trading-Off Equilibrium and Reaction Kinetics through Temperature Management"; 6th International Conference on Microreaction Technology; Mar. 2002.

(List continued on next page.)

Primary Examiner—Robert H. Spitzer
(74) Attorney, Agent, or Firm—Renner, Otto, Boisselle & Sklar, LLP

(57) ABSTRACT

This invention relates to a process for separating a fluid component from a fluid mixture comprising the fluid component, the process comprising: (A) flowing the fluid mixture into a microchannel separator; the microchannel separator comprising a plurality of process microchannels containing a sorption medium, a header and a footer, the combined internal volume of the header and the footer being up to about 40% of the internal volume of the process microchannels; the fluid mixture being maintained in the microchannel separator until at least part of the fluid component is sorbed by the sorption medium; purging the microchannel separator to displace non-sorbed parts of the fluid mixture from the microchannel separator; and (B) desorbing the fluid component from the sorption medium and flowing a flush fluid through the microchannel separator to displace the desorbed fluid component from the microchannel separator. The process is suitable for purifying oxygen as well as effecting other fluid separations.

68 Claims, 11 Drawing Sheets

U.S. PATENT DOCUMENTS

| | | | | |
|---|---|---|---|---|
| 4,680,037 A | * | 7/1987 | Ramprasad et al. | 95/44 |
| 4,735,634 A | * | 4/1988 | Norman et al. | 95/44 |
| 4,801,308 A | * | 1/1989 | Keefer | 95/96 |
| 4,880,032 A | * | 11/1989 | Doutt | 137/625.19 |
| 4,888,032 A | | 12/1989 | Busch | 55/38 |
| 5,165,247 A | * | 11/1992 | Rockenfeller et al. | 62/77 |
| 5,308,457 A | | 5/1994 | Dalla Betta et al. | 204/131 |
| 5,309,637 A | | 5/1994 | Moriarty | 29/890.054 |
| 5,317,805 A | | 6/1994 | Hoopman et al. | 29/890.03 |
| 5,324,452 A | | 6/1994 | Allam et al. | 252/373 |
| 5,419,156 A | | 5/1995 | Sywulka | 62/476 |
| 5,611,214 A | | 3/1997 | Wegeng et al. | 62/498 |
| 5,727,618 A | | 3/1998 | Mundinger et al. | 165/80.4 |
| 5,733,451 A | * | 3/1998 | Coellner et al. | 210/496 |
| 5,811,062 A | | 9/1998 | Wegeng et al. | 422/129 |
| 6,126,723 A | | 10/2000 | Drost et al. | 96/4 |
| 6,129,973 A | | 10/2000 | Martin et al. | 428/166 |
| 6,192,596 B1 | | 2/2001 | Bennett et al. | 34/76 |
| 6,200,536 B1 | | 3/2001 | Tonkovich et al. | 422/177 |
| 6,261,345 B1 | * | 7/2001 | Miyano et al. | 95/96 |
| 6,293,998 B1 | | 9/2001 | Dolan et al. | 95/96 |
| 6,352,577 B1 | | 3/2002 | Martin et al. | 96/4 |
| 6,381,846 B2 | | 5/2002 | Insley et al. | 29/890.039 |
| 6,436,171 B1 | * | 8/2002 | Wang et al. | 95/96 |
| 6,491,740 B1 | * | 12/2002 | Wang et al. | 95/90 |
| 6,503,298 B1 | * | 1/2003 | Monzyk et al. | 95/96 |
| 6,508,862 B1 | * | 1/2003 | Tonkovich et al. | 95/106 |
| 6,517,610 B1 | * | 2/2003 | de la Houssaye | 95/107 |
| 6,517,611 B1 | * | 2/2003 | Kuznicki et al. | 95/144 |
| 2001/0000858 A1 | * | 5/2001 | Rockenfeller et al. | 95/116 |
| 2001/0003950 A1 | * | 6/2001 | Zhang et al. | 95/102 |
| 2002/0194990 A1 | * | 12/2002 | Wegeng et al. | 95/114 |
| 2003/0015093 A1 | * | 1/2003 | Wegeng et al. | 95/114 |
| 2003/0041733 A1 | * | 3/2003 | Seguin et al. | 96/108 |

OTHER PUBLICATIONS

Srinivasan, et al.; "Micromachined Reactors for Catalytic Partial Oxidation Reactions"; AIChE Journal; Nov. 1997; vol. 43, No. 11; pp. 3059–3069.

Nishide et al.; "Effect of Polymer Matrix on the Oxygen Diffusion via a Cobalt Porphyrin Fixed in a Membrane"; Macromolecules,, 1991, 24, 6306–6309.

Pez et al.; "Molten salt facilitated transport membranes. Part 1. Separation of oxygen from air at high temperatures"; Journal of Membrane Science, 66 (1992) 21–30.

Yang et al.; "Facilitated Transport of Oxygen in Ethyl Cellulose Membranes Containing Cobalt Porphyrins as Oxygen Carriers"; Journal of Applied Polymer Science; vol. 77, 484–488; 2000.

Greenwood et al.; Chemistry of the Elements; Pergamon Press; pp. 1242–1289; 1984.

Kohl et al.; Gas Purification; Fifth Edition, Gulf Publishing Co. (1997), pp. 1–39.

Kays et al.; Compact Heat Exchangers; Third Edition, McGraw–Hill Book Company (1984), pp. 1–10.

Humphrey et al.; Separation Process Technology; McGraw–Hill (1997), pp. 1–10.

Lide et al.; CRC Handbook of Chemistry and Physics; $77^{th}$ Edition (1996–1997); pp. 8–2 to8–33.

Rao et al.; "Effects of Flow MAL–Distribution in Parallel Micro–Channels"; National Heat Transfer Conference; vol. 2 (2000); pp. 203–211.

Hay; "Oxygen Carriers and Oxygen Transport Proteins"; Bio–Inorganic Chemistry (1984), Ellis Horwood Ltd.; pp. 102–127.

Liquid Membranes for the Production of Oxygen–Enriched Air. Final Report; U.S. Department of Commerce, National Technical Information Service; (DE 85006056) 1985.

Parkinson; "Chementator: This Sorbent Cares Only for Oxygen"; Chemical Engineering, Chemical Week Publishing, New York, NY; vol. 103, n. 1, Jan. 1996.

Chemical & Engineering News; Feb. 5, 1996; "High–Capacity Oxygen Sorbents Show Promise in Air Separation Applications"; pp. 35–37.

* cited by examiner

PROCESS FOR SEPARATING A FLUID COMPONENT FROM A FLUID MIXTURE USING MICROCHANNEL PROCESS TECHNOLOGY

TECHNICAL FIELD

This invention relates to a process for separating a fluid component from a fluid mixture containing the fluid component using microchannel process technology. This invention is particularly suitable for separating purified oxygen from sources such as air containing the oxygen.

BACKGROUND OF THE INVENTION

When oxygen is used as a raw material source for processes such as combustion, welding and cutting, the operation of fuel cells or in chemical manufacturing, the performance and economics of such processes, and the environmental compatibility of the exhaust gases produced by such processes typically improve as the purity of $O_2$ in the feed gas increases.

Air is a primary source for $O_2$. However, air contains 21% $O_2$, leaving 79% of the air (mostly $N_2$) to pass through the processes employing oxygen as a raw material source thereby degrading the performance of such process without adding value. For example, the $N_2$ component in air may consume pressurization energy, provide N for NOx formation, cool flame temperatures, dilute the product gases, and require larger and more costly gas handling equipment.

Cryogenic distillation is a commonly used technique for purifying $O_2$. However, this process requires large scale operations to achieve economies of scale in order to produce high purity $O_2$. Another is pressure swing adsorption (PSA). With PSA, $O_2$ is forced under pressure to penetrate into molecular-size pores in sorbent materials (normally zeolites), where it does so only slightly further than $N_2$ in the same diffusion time. Then on pressure release, the $N_2$ is removed slightly faster than the $O_2$ which is sorbed a little more strongly by the pores. By adding many stages with cross-flow and counter-flow design, purification of $O_2$ may be achieved. However, for both techniques, the cost and complexity of pressurization throughout the process is significant. A third technique involves electrolysis of aqueous KOH solution, where $H_2$ gas is also produced. The cost of electricity for this technique is high and as a result the technique is seldom used. Due to the wide number of uses for purified $O_2$ and the scales of use of this material, the foregoing techniques for purifying oxygen are insufficient. The problem, therefore, is to provide a more efficient technique for purifying oxygen.

The present invention provides a solution to this problem by providing an efficient process for purifying oxygen. The inventive process is also suitable for effecting other fluid separations.

SUMMARY OF THE INVENTION

This invention relates to a process for separating a fluid component from a fluid mixture comprising the fluid component, the process comprising:

(A) flowing the fluid mixture into a microchannel separator; the microchannel separator comprising a plurality of process microchannels containing a sorption medium, a header providing a flow passageway for fluid to enter the process microchannels, and a footer providing a flow passageway for fluid to leave the process microchannels, the combined internal volume of the header and the footer being up to about 40% of the internal volume of the process microchannels; the fluid mixture being maintained in the microchannel separator until at least part of the fluid component is sorbed by the sorption medium; purging the microchannel separator to displace non-sorbed parts of the fluid mixture from the microchannel separator; and (B) desorbing the fluid component from the sorption medium and flowing a flush fluid through the microchannel separator to displace the desorbed fluid component from the microchannel separator.

In one embodiment, the invention relates to a process for separating a fluid component from a fluid mixture comprising the fluid component, the process comprising:

(I)(A) flowing part of the fluid mixture into a first microchannel separator; the first microchannel separator comprising a plurality of first process microchannels containing a first sorption medium, a first header providing a flow passageway for fluid to enter the first process microchannels, and a first footer providing a flow passageway for fluid to leave the first process microchannels, the combined internal volume of the first header and the first footer being up to about 40% of the internal volume of the first process microchannels; the fluid mixture being maintained in the first microchannel separator until at least part of the fluid component is sorbed by the first sorption medium; purging the first microchannel separator to displace non-sorbed parts of the fluid mixture from the first microchannel separator;

(I)(B) desorbing the fluid component from the first sorption medium and flowing a first flush fluid through the first microchannel separator to displace the desorbed fluid component from the first microchannel separator;

(II)(A) flowing another part of the fluid mixture into a second microchannel separator; the second microchannel separator comprising a plurality of second process microchannels containing a second sorption medium, a second header providing a flow passageway for fluid to enter the second process microchannels, and a second footer providing a flow passageway for fluid to leave the second process microchannels, the combined internal volume of the second header and the second footer being up to about 40% of the internal volume of the second process microchannels; the fluid mixture being maintained in the second microchannel separator until at least part of the fluid component is sorbed by the second sorption medium; purging the second microchannel separator to displace non-sorbed parts of the fluid mixture from the second microchannel separator; and (II)(B) desorbing the fluid component from the second sorption medium and flowing a second flush fluid through the second microchannel separator to displace the desorbed fluid component from the second microchannel separator.

In one embodiment, the invention relates to a process for separating a first fluid component from a second fluid component, the first fluid component and the second fluid component being contained in a first fluid mixture, the process comprising:

(I) mixing the first fluid mixture with a third fluid component to form a second fluid mixture;

(II) separating the second fluid mixture into a third fluid mixture and a fourth fluid mixture, the third fluid mixture comprising the first fluid component and the third fluid component, the fourth fluid mixture comprising the second fluid component and the third fluid component:

(III)(A) flowing the third fluid mixture into a first microchannel separator; the first microchannel separator comprising a plurality of first process microchannels containing a first sorption medium, a first header providing a flow passageway for fluid to enter the first process microchannels, and a first footer providing a flow passageway for fluid to leave the first process microchannels, the combined internal volume of the first header and the first footer being up to about 40% of the internal volume of the first process microchannels; the third fluid mixture being maintained in the first microchannel separator until at least part of the first fluid component is sorbed by the first sorption medium; purging the first microchannel separator to displace non-sorbed parts of the third fluid mixture from the first microchannel separator;

(III)(B) desorbing the first fluid component from the first sorption medium and flowing a first flush fluid through the first microchannel separator to displace the desorbed first fluid component from the first microchannel separator;

(IV)(A) flowing the fourth fluid mixture into a second microchannel separator; the second microchannel separator comprising a plurality of second process microchannels containing a second sorption medium, a second header providing a flow passageway for fluid to enter the second process microchannels, and a second footer providing a flow passageway for fluid to leave the second process microchannels, the combined internal volume of the second header and the second footer being up to about 40% of the internal volume of the second process microchannels; the fourth fluid mixture being maintained in the second microchannel separator until at least part of the second fluid component is sorbed by the second sorption medium; purging the second microchannel separator to displace non-sorbed parts of the fourth fluid mixture from the second microchannel separator; and (IV)(B) desorbing the second fluid component from the second sorption medium and flowing a second flush fluid through the second microchannel separator to displace the desorbed second fluid component from the second microchannel separator.

In one embodiment, the invention relates to a process for separating a fluid component from a fluid mixture comprising the fluid component, the process comprising:

(I)(A) flowing the fluid mixture into a first microchannel separator; the first microchannel separator comprising a plurality of first process microchannels containing a first sorption medium, a first header providing a flow passageway for fluid to enter the first process microchannels, and a first footer providing a flow passageway for fluid to leave the first process microchannels, the combined internal volume of the first header and the first footer being up to about 40% of the internal volume of the first process microchannels; the fluid mixture being maintained in the first microchannel separator until at least part of the fluid component is sorbed by the first sorption medium; removing non-sorbed parts of the fluid mixture from the first microchannel separator;

(I)(B) desorbing the fluid component from the first sorption medium and flowing a first flush fluid through the first microchannel separator to displace the desorbed fluid component from the first microchannel separator;

(II)(A) flowing the non-sorbed part of the fluid mixture removed from the first microchannel separator during step (I)(A) into a second microchannel separator; the second microchannel separator comprising a plurality of second process microchannels containing a second sorption medium, a second header providing a flow passageway for fluid to enter the second process microchannels, and a second footer providing a flow passageway for fluid to leave the second process microchannels, the combined internal volume of the second header and the second footer being up to about 40% of the internal volume of the second process microchannels; the non-sorbed part of the fluid mixture being maintained in the second microchannel separator until at least part of the fluid component is sorbed by the second sorption medium; purging the second microchannel separator to displace non-sorbed parts of the fluid mixture from the second microchannel separator; and (II)(B) desorbing the fluid component from the second sorption medium and flowing a second flush fluid through the second microchannel separator to displace the desorbed fluid component from the second microchannel separator.

The temperature of the sorption medium and/or the pressure within the process microchannels may be changed as the inventive process progresses from step (A) to step (B). In one embodiment, the sorption medium is at a lower temperature during step (A) as compared to the temperature used during step (B). In this embodiment, the process may be referred to as temperature swing sorption (TSS) or temperature swing adsorption (TSA) process.

In one embodiment, the inlet and outlet channels of the microprocess separator may be the same lines, i.e., the fluids can be introduced into the microchannel separator and removed from the microchannel separator via the same ports to the microchannel separator, thereby minimizing the number of entries that need to be fabricated into the microchannel separator.

BRIEF DESCRIPTION OF THE DRAWINGS

In the annexed drawings, like parts and features have like designations.

DETAILED DESCRIPTION OF THE INVENTION

The term "microchannel" refers to a channel having at least one internal dimension of height or width of up to about 10 millimeters (mm), and in one embodiment up to about 5 mm, and in one embodiment up to about 2 mm.

The term "fluid" refers to a gas, a liquid, or a gas or a liquid containing dispersed solids, or a mixture thereof.

The term "residence time," which may also be referred to as the "average residence time," is the internal volume of a space occupied by a fluid flowing through the space divided by the average volumetric flowrate for the fluid flowing through the space at the temperature and pressure being used.

Figure 1:
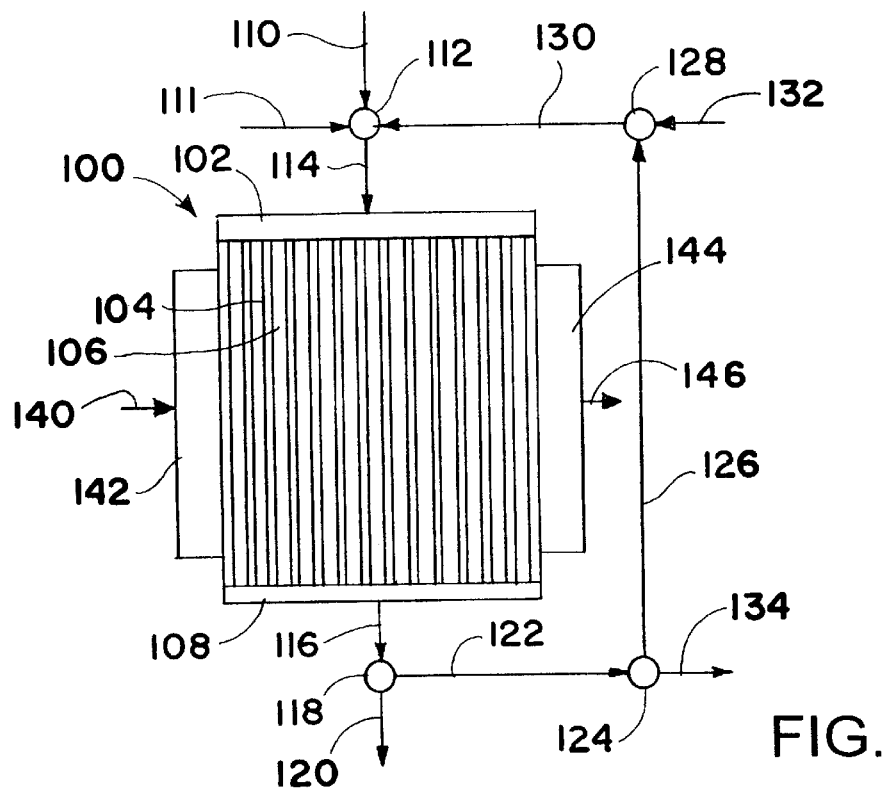
FIG. 1 is a flow sheet illustrating the inventive process in a particular form wherein microprocess technology is used to separate a fluid component from a fluid mixture containing the fluid component.

The inventive process involves separating a fluid component (e.g., $O_2$) from a fluid mixture (e.g., air) containing the fluid component using a microchannel separator. The invention will be described initially with reference to FIG. 1. Referring to FIG. 1, microchannel separator 100 is comprised of a header 102, a plurality of process microchannels 104 which contain a sorption medium 106 and operate in parallel, and a footer 108. The header 102 provides a passageway for fluid to flow into the process microchannels 108 with an even or substantially even distribution of flow to the process microchannels. The footer 108 provides a passageway for fluid to flow from the process microchannels 104 in a rapid manner with a relatively high rate of flow.

There is practically no upper limit to the number of process microchannels 104 that may be used in microchannel separator 100. For example, the microchannel separator 100 may contain two, three, four, five, six, eight, ten, twenty, fifty, hundreds, thousands, tens of thousands, hundreds of thousands, millions, etc., of the process microchannels 104. Each of the process microchannels 104 may have at least one internal dimension of height or width of up to about 10 mm, and in one embodiment up to about 5 mm, and in one embodiment up to about 2 mm, and in one embodiment from about 0.1 to about 1.5 mm, and in one embodiment from about 0.5 to about 1 mm.

The header 102, footer 108 and the process microchannels 104 may be made of any material that provides sufficient strength, dimensional stability and heat transfer characteristics to permit operation of the inventive process. These materials include steel; aluminum, titanium; nickel, platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; or a combination of two or more thereof.

The combined internal volume of the header 102 and the footer 108 may be up to about 40% of the total internal volume of the process microchannels 104, and in one embodiment from 1 to about 30%, and in one embodiment from about 1 to about 20%, and in one embodiment about 1 to about 10%, and in one embodiment about 1 to about 5%. The space occupied by the header and the footer, and the piping leading to the header and away from the footer, may be referred to as "dead zones" due to the fact that fluids contained in these sections do not contact the sorption medium 106 and therefore do not undergo sorption/desorption during the inventive process. The reduction of the volume of these dead zones to the low levels indicated above is significant because with such low levels of dead zone space it is possible to provide more complete and efficient fluid separations at shorter cycle times. Thus the production of separated fluid components such as $O_2$ having relatively high degrees of purity is possible with the inventive process.

The inventive process may be used to separate any fluid component from any fluid mixture containing the fluid component. Examples of such separations include oxygen from air, olefins (e.g., ethylene) from mixtures of olefins and paraffins (e.g., ethane), and the like. The fluid components that may be separated or purified include oxygen, hydrogen, nitrogen, $NO_x$ (e.g., NO, $NO_2$), CO, $CO_2$, $H_2S$, HCN, $SO_2$, $CH_3SCH_3$, olefins (e.g., ethylene), paraffins (e.g., ethane), aromatic compounds (e.g., benzene), isomers, halogenated compounds (e.g., chlorides), nitrates, sulfates, sugars, esters, alcohols, ethers, nitro compounds, hydroxyl amines, or mixtures of two or more thereof.

Step (A) of the inventive process may be conducted by flowing the fluid mixture through line 110 to valve 112, through valve 112 to line 114 and through line 114 to microchannel separator 100. In microchannel separator 100 the fluid mixture flows into header 102, process microchannels 104 in contact with sorption medium 106, and footer 108. The fluid mixture is maintained in header 102, process microchannels 104 and footer 108 at a desired temperature and pressure to permit sorption of at least part of the fluid component by the sorption medium 106. This process may be continued until a desired loading of the sorption medium 106 by the fluid component is achieved. The desired loading level may be in the range of about 0.0001 to about 1 gram of fluid component per gram of sorption medium, and in one embodiment about 0.001 to about 0.1 gram of fluid component per gram of sorption medium. At the end of this sorption step a purging fluid flows through line 111 to valve 112, through valve 112 to line 114 and from line 114 to the header 102, process microchannels 104 and footer 108 to displace the non-sorbed part of the fluid mixture from the microchannel separator 100. The purging fluid and non-sorbed part of the fluid mixture flow from the header 102, the process microchannels 104 and the footer 108 through line 116 to valve 118, through valve 118 to line 120 and through line 120 out of the system. As an alternative to the foregoing, the purging fluid and the non-sorbed part of the fluid mixture may flow in the opposite direction through the process microchannels 104, that is, from footer 108 through the process microchannels 104 to the header 102.

The sorption part of step (A) of the inventive process may be conducted at a temperature of about −100° C. to about 200° C., and in one embodiment about −40 to about 50° C. The pressure within the process microchannels 104 during the sorption part of step (A) may range from about 0.01 to about 50 atmospheres, and in one embodiment about 0.1 to about 20 atmospheres, and in one embodiment about 1 to about 10 atmospheres. The period of time for the sorption to occur may range from about 0.01 to about 100 seconds, and in one embodiment about 0.1 to about 50 seconds, and in one embodiment about 1 to about 10 seconds.

The process microchannels 104 may be purged by flowing a purging fluid through the microchannels to displace the non-sorbed parts of the fluid mixture. The purging fluid may be at a temperature of about 0 to about 300° C., and in one embodiment about 40 to about 180° C. In one embodiment, the temperature of the purging fluid is about 10 to about 100° C. above the temperature used during sorption part of step (A), and in one embodiment 20 to about 80° C. above the step (A) sorption temperature. The residence time for the purging fluid in the process microchannels 104 may range from 0.001 to about 100 seconds, and in one embodiment 0.01 to about 10 seconds. Examples of purging fluids that may be used for oxygen purification include helium, argon, carbon dioxide, water vapor, and mixtures of two or more thereof. Purging fluids for purifications other than oxygen may include hydrocarbons (both condensable and non-condensable at ambient conditions) and nitrogen.

Alternatively, the non-sorbed fluids in the process microchannels may be purged using a vacuum. The vacuum that may be used involves using a pressure that is slightly less than the operating pressure being used in the process microchannels. The vacuum may be from about 0.1 to about 10 atmospheres below the operating pressure used in the process microchannels. The vacuum (or pressure) may be as low as about 0.01 atmosphere of absolute pressure.

Step (B) of the inventive process involves desorbing the sorbed fluid component from the sorption medium 106. This desorption step may be conducted by increasing or decreasing the temperature of the sorption medium 106 and/or increasing or decreasing the pressure within the process microchannels 104 relative to the temperature and pressure used during the sorption part of step (A). The pressure used during step (B) may be the same as the pressure used during the sorption part of step (A). In one embodiment, step (B) is conducted at a higher temperature and a lower pressure than the sorption part of step (A). The temperature used in step (B) may be increased by about 1 to about 200° C., and in one embodiment about 10 to about 50° C., above the temperature that is used during the sorption part of step (A). The temperature may be raised to a level of about 0 to about 300° C., and in one embodiment about 40 to about 200° C. during step (B). Alternatively, the temperature used in step (B) may be decreased by about 1 to about 300° C., and in one embodiment about 10 to about 100° C., below the temperature that is used during the sorption part of step (A). The temperature may be decreased to a level of about 20 to about 200° C., and in one embodiment about 80 to about 150° C. during step (B). The pressure within the process microchannels 104 during step (B) may be reduced by about 0.001 to about 50 atmospheres, and in one embodiment about 0.1 to about 10 atmospheres below the pressure used during the sorption part of step (A). The pressure may be reduced to a level of about 1 to about 10 atmospheres, and in one embodiment 1 to about 8 atmospheres during step (B) of the inventive process. Alternatively, the pressure within the process microchannels 104 during step (B) may be raised by about 0.001 to about 50 atmospheres, and in one embodiment about 0.01 to about 10 atmospheres above the pressure used during the sorption part of step (A). The pressure during step (B) may be raised to a level of 1 to about 50 atmospheres, and in one embodiment 1 to about 10 atmospheres. The percentage of sorbed material that is desorbed during this step (B) may range from about 1 to about 100%, and in one embodiment about 10 to about 80%. The cycle time for performing this desorbing step may range from about 0.001 to about 100 seconds, and in one embodiment about 1 second to about 10 seconds for a gaseous fluid. The cycle time for performing this desorbing step may range from about 0.001 to about 300 seconds, and in one embodiment about 1 to about 30 seconds for a liquid fluid.

During step (B) a flush fluid flows through the process microchannels 104 to displace the desorbed fluid component from the process microchannels 104. The flow of the flush fluid may be simultaneous with the above-described desorption, or it may occur subsequent to such desorption. The start of the flow of flush fluid may be delayed until after the start of the desorption step and then continued after the end of the desorption step. The flush fluid flows through line 132 to valve 128, through valve 128 to line 130, through line 130 to valve 112, through valve 112 to line 114, and through line 114 into microchannel separator 100. Within the microchannel separator 100 the flush fluid flows from header 102 through process microchannels 104 in contact with sorption medium 106 to footer 108. The flush fluid flows from footer 108 through line 116 to valve 118, through valve 118 to line 122, through line 122 to valve 124 and from valve 124 to and through line 134 and from line 134 to a collection vessel (not shown in the drawings). The flush fluid may be the same as the fluid component being separated (for example $O_2$) or it may be a fluid that is non-reactive with the fluid component being separated. Examples of such non-reactive fluids include helium, argon, carbon dioxide, water vapor, nitrogen, and mixtures of two or more thereof. Note that if the desired separation is oxygen from air, the use of nitrogen as the flush fluid would not be recommended. If the flush fluid is the same as the desorbed fluid component (for example, if both are $O_2$) then no further separation is required to provide the fluid component as the desired product from the inventive process. If the flush fluid is not the desired fluid component, then the flush fluid may be separated from the desired fluid component using known techniques (e.g., condensation, evaporation, etc.). Part of the flush fluid may be recirculated to the microchannel separator 100 by flowing it through line 126 to valve 128, through valve 128 to line 130, through line 130 to valve 112, through valve 112 to and through line 114 to microchannel separator 100. This process may be continued until a desired removal of the fluid component from the microchannel separator 100 is achieved.

The flush fluid may be at a temperature of about 0° C. to about 200° C., and in one embodiment about 40 to about 150° C. In one embodiment, the temperature of the flush fluid is about 1 to about 100° C. higher than the temperature used to desorb the fluid component during step (B), and in one embodiment the flush fluid temperature is about 10 to about 50° C. above the desorption temperature. The pressure within the process microchannels during the flushing step may range from about 0.01 to about 50 atmospheres, and in one embodiment about 1 to about 10. The residence time for the flush fluid in the process microchannels 104 during step (B) may range from about 0.0001 to about 10 seconds, and in one embodiment about 0.001 to about 1 second. The pressure drop for the flush fluid flowing through the process microchannels during step (B) may range from about 0.001 to about 10 atmospheres, and in one embodiment about 0.01 to about 1 atmosphere. The Reynolds Number for the flow of the flush fluid through the process microchannels 104 during step (B) may range from about 1 to about 4000, and in one embodiment about 10 to about 1500.

At the end of step (B) the sorption medium 106 may be regenerated. This may be done by flowing a regenerating fluid through the process microchannels 104 in contact with the sorption medium 106. The regenerating fluid may be air, water vapor, argon, helium, carbon dioxide or nitrogen. The regenerating fluid may flow from the header 102 through the process microchannels 104 and then to the footer 108, or in the opposite direction from the footer 108 through the process microchannels 104 to the header 102. The temperature of the regenerating fluid may be from about 0 to about 200° C., and in one embodiment about 20 to about 80° C. In one embodiment, the temperature of the regenerating fluid may be about 1 to about 100° C., and in one embodiment about 40 to about 80° C. below the temperature of the flush fluid used during step (B). The pressure within the process microchannels 104 during this regeneration step may range from about 0.01 to about 50 atmospheres, and in one embodiment about 1 to about 10 atmospheres. The residence time of the regenerating fluid in the process microchannels 104 may range from about 0.0001 to about 10 seconds, and in one embodiment about 0.001 second to about 1 second.

During the operation of steps (A) and (B) of the inventive process, the microchannel separator 100 may be cooled or heated using heat exchange microchannels (not shown in the drawings). A heat exchange fluid flows from heat exchange header 142 through the heat exchange microchannels to heat exchange footer 144. The heat exchange microchannels are aligned in a cross-flow direction relative to the process microchannels 104 as indicated by arrows 140 and 146. The heat exchange fluid transfers heat between the heat exchange microchannels and the process microchannels 104. The heat exchange fluid may be recirculated using known techniques. Alternatively, the heat exchange microchannels may be oriented to provide for flow of the heat exchange fluid in a cocurrent or counter current direction relative to the direction of fluid flowing through the process microchannels 104. Each of the heat exchange microchannels may have at least one internal dimension of height or width of up to about 2 mm, and in one embodiment from about 0.1 to about 1.5 mm, and in one embodiment from about 0.5 to about 1 mm. The heat exchange microchannels may be made of any material that provides sufficient strength, dimensional stability and heat transfer characteristics to permit the operation of the inventive process. These materials include: steel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; or a combination of two or more thereof. The heat exchange fluid may be any fluid. These include air, steam, liquid water, gaseous nitrogen, liquid nitrogen, oils such as mineral oil, and heat exchange fluids such as Dowtherm A and Therminol which are available from Dow-Union Carbide.

Figure 8:
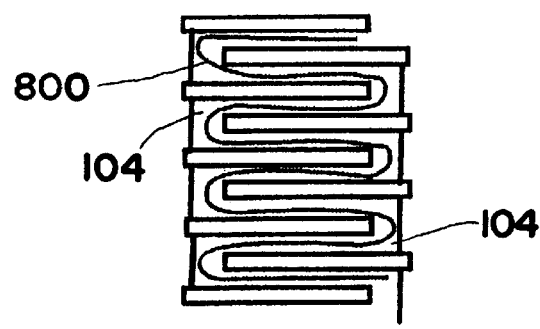
FIG. 8 is a schematic illustration of a cross-sectional view of a number of process microchannels used with the inventive process, the process microchannels containing a heating element.

Alternatively, the process microchannels 104 may be heated using a resistance heater. This is illustrated in FIG. 8 which shows malleable resistance heater 800, which can be in the form of a heating tape, positioned inside the process microchannels 104. The resistance heater 800 may alternatively be in the form of a wire or similar structure. Another heating alternative involves using a metal structure such as a metal foam that functions as a resistance heater and is used as a support for the sorption medium 106, the sorbent material being coated on the exterior surface of the metal structure. Another possibility involves using heat conductive particulates intermixed with the sorption medium.

When the fluid mixture entering step (A) is non-condensed at least about 1% by volume of the fluid mixture that is sorbed during step (A) may be desorbed during step (B), the time period for steps (A) and (B) may be up to about 100 seconds, and in one embodiment up to about 10 seconds.

When the fluid mixture entering step (A) is condensed at least about 10% by volume of the fluid mixture that is sorbed during step (A) may be desorbed during step (B), the time period for steps (A) and (B) may be up to about 100 seconds, and in one embodiment up to about 10 seconds.

In one embodiment of this invention, the process microchannels 104 may have an internal dimension of height or width of up to about 10 mm, and the heat exchange microchannels may have an internal dimension of height or width of up to about 2 mm. In this embodiment, the relatively large internal height or width of the process microchannels 104 may be used while still allowing relatively fast cycle times if the effective thermal conductivity of the sorption medium 106 is relatively high. For most polymeric or ceramic based sorption mediums, the effective thermal conductivity is typically less than about 1 W/m/K. As the effective thermal conductivity is increased either through the use of co-mixing highly conductive powders or through the use of a highly conductive sorption medium, the height or width of the sorption medium and correspondingly the height or width of the process microchannels 104 may be increased. For effective thermal conductivities of less than about 2 W/m/K, the process microchannels 104 may have an internal height or width of up to about 2 mm. However, as the effective thermal conductivity increases above about 2 W/m/K, the use of larger process microchannels 104 of up to about 10 mm may be used. In these embodiments, heat exchange microchannels may be used to quickly cool the sorption medium 106. A heating microchannel or resistance heating may be used to heat the sorption medium 106.

In one embodiment, a short cycle time may be achieved by the use of headers 102 and footers 108 that do not contribute substantially to the overall fluid residence time. For example, a one second cycle time may not be achieved if the fluid is retained within the header for 10 seconds. However, if the combined fluid residence time in the header and footer is less than about 0.4 seconds, an overall cycle time of one second may be achieved.

The design of headers 102 and footers 108 for the fast flush of the fluid mixture, purging fluid and flush fluid requires the balance of short residence times with low header and footer pressure drop to allow for suitable fluid distribution. In one embodiment, the headers 102 and footers 108 have geometric designs that enhance the flow of fluid through such headers and footers. Angled headers and footers act to both reduce volume (and thus residence time) and pressure drop to enable good flow distribution. The angle may be in the range of about 5 to about 90 degrees. In addition, open header and footer volumes may be replaced with designs where open volume is only present to directly connect with the process microchannels 104 and is not present above fins, metal plates, and the like. For example, a pipe may be used to distribute fluids from process microchannel to process microchannel (as the pressure drop in a circular or near circular pipe will be lower than rectangular ducts). The flow from the pipe to the process microchannel may be connected via a severe angular entrance region that tapers into a larger rectangular process microchannel. The tapered entrance region advantageously does not overlap fins, metal plates and the like, which may restrict the total volume in the header. Tapered or angular headers have the additional advantage of inhibiting the formation of stagnant areas that are difficult to flush.

In one embodiment of the invention, a split cycle is used to tailor the purity of the desired fluid component. A split cycle is characterized by opening and closing the valves at the end of the process microchannel array at a faster rate than the valves that move the feed between sorption medium beds. This process increases the fluid component purity and exhausts the fluid mixture until the purity achieves a desired level. As an example, the feed may alternate between two sorption medium beds at a rate of 10 seconds and split cycle times of one second and nine seconds. During the desorption stage, the purge fluid flows through the sorption medium bed to remove the non-sorbed material and then desorb the desired fluid component. During the first part of the cycle the concentration of the effluent fluid contains components of the entire feed fluid mixture that is retained from the previous feed cycle. The temperature during the first part of the split cycle may either be the sorption temperature or higher than the sorption temperature and approach or equal the desorption temperature. The non-sorbed fluids from the previous feed sorption cycle are removed from the process microchannel sorption medium bed during the first part of the split cycle desorption stage. During this first part of the split cycle the concentration of all components decreases except those sorbed during the previous cycle. The effluent of the first part of the split cycle is sent to an exhaust. When the product purity is sufficiently high to achieve the desired target, the valves are switched at the end of the process microchannel array to collect the desorbing fluid effluent as the desired fluid component product. The split cycle may be performed at any time during the overall cycle. For a 10 second feed cycle time, the split cycle time may be one second, five seconds, or any other value less than 10 seconds.

Figure 2:
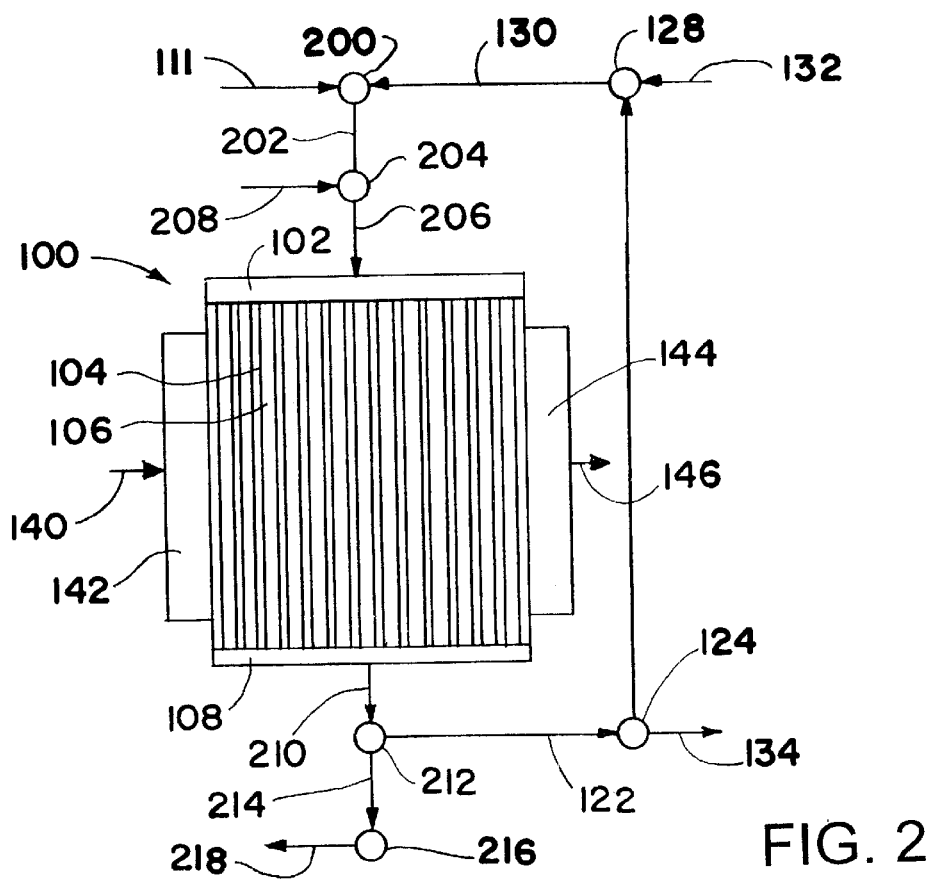
FIG. 2 is a flow sheet illustrating an alternate embodiment of the inventive process.

The process illustrated in FIG. 2 is the same as illustrated in FIG. 1 with the exception lines 110 and 114 and valve 112 in FIG. 1 are replaced by lines 202, 206 and 208, and valves 200 and 204 in FIG. 2. Also, lines 116 and 120, and valve 118 in FIG. 1 are replaced by lines 210, 214 and 218, and valves 212 and 216 in FIG. 2. The inlet line and valve arrangement used in FIG. 2 permits entry of the flush fluid through valve 200 and line 202 upstream of the entry for the fluid mixture through line 208 and valve 204. Similarly, the outlet for the flush fluid through lines 210 and 122 and valve 212 are upstream of the outlet for the fluid mixture through lines 214 and 218 and valve 216. With this valving arrangement, the purging fluid and the flush fluid may be used to sweep the areas occupied by the fluid mixture for a rapid flush of the system. The fluid mixture outlet valve 216 may remain open during step (B) of the inventive process. Once sufficient fluid component is observed at the fluid mixture outlet 218, valve 216 can be closed and the fluid component can then flow through outlet valve 212 to prevent contamination of the fluid component flowing out of the system through lines 122 and 134 and valve 124.

Figure 3:
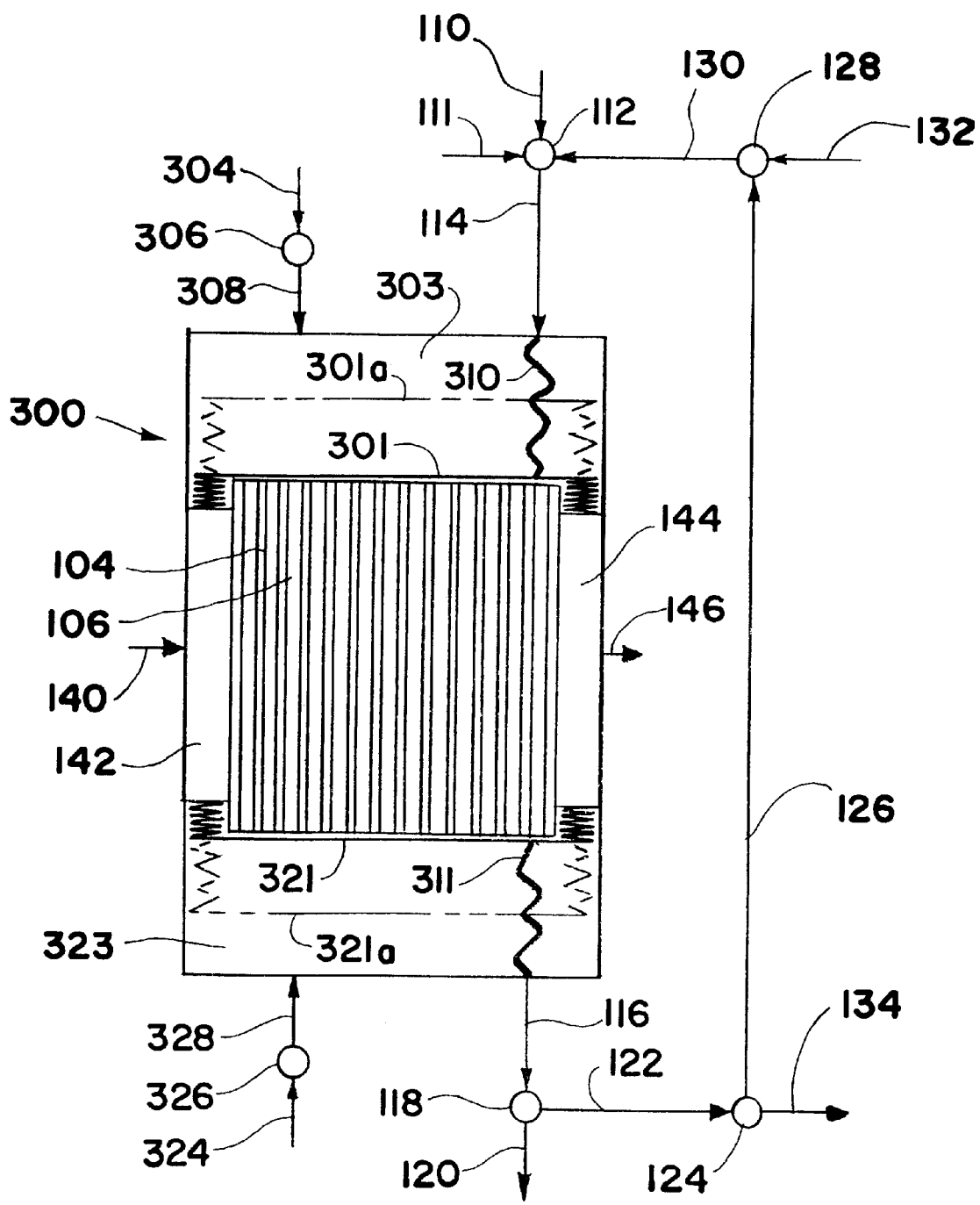
FIG. 3 is a flow sheet illustrating another alternate embodiment of the inventive process.
Figure 4:
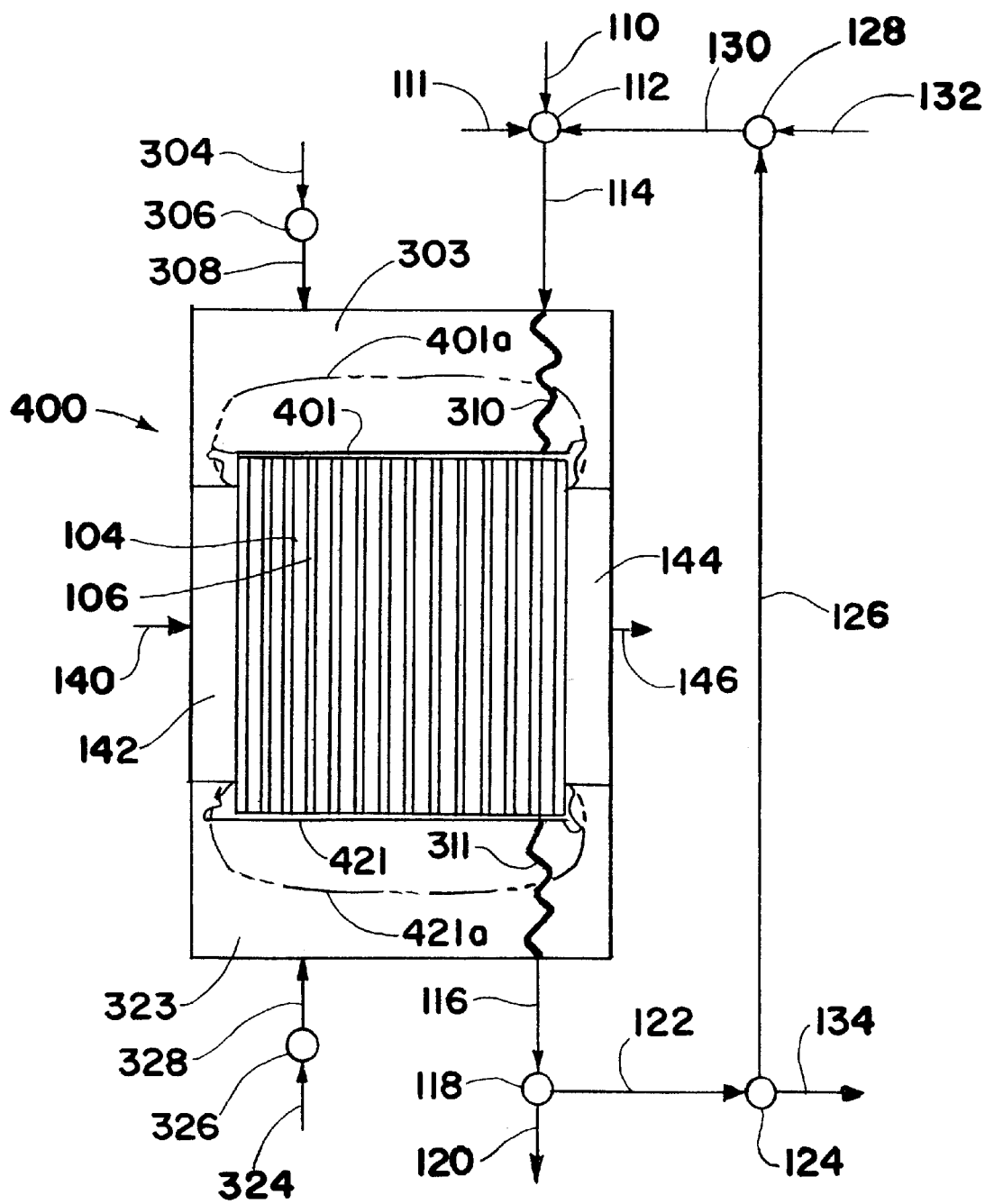
FIG. 4 is a flow sheet illustrating another alternate embodiment of the inventive process.

The processes illustrated in FIGS. 3 and 4 are similar to the process depicted in FIG. 1 with the exception that the processes illustrated in FIGS. 3 and 4 employ headers and footers that may expand and contract. The design illustrated in FIG. 3 employs microchannel separator 300 which includes a bellow 301 in the header which is indicated by the reference numeral 301 in its contracted state and by the reference numeral 301a in its expanded state. Pressurized fluid enters space 303 through lines 304 and 308 and valve 306 to contract the bellow 301. To expand the bellow to the position indicated by reference numeral 301a the pressurized fluid is removed from space 303 through lines 304 and 308 and valve 306. The pressure differential on the inside of the bellow relative to the pressure on its outside in space 303 causes expansion of the bellow 301. Similarly, the bellow 321 in the footer is shown in its contracted state by reference numeral 321 and its expanded state by reference numeral 321a. Pressurized fluid entering and exiting space 323 through lines 324 and 328 in valve 326 provide for expansion and contraction of the bellow 321. Flexible feedline 310 connects inlet line 114 to the interior of the header. Flexible outlet line 311connects outlet line 116 to the interior of the footer.

The design illustrated in FIG. 4 is similar to the design in FIG. 3 with the exception that microchannel separator 400 includes expandable bladders 401 and 421 that are used to provide for expansion and contraction of the header and the footer rather than bellows 301 and 321. The bladders 401 and 421 are made of an expandable material such as rubber. The expandable bladder 401 used in the header is depicted in its contracted state by the reference numeral 401 and in its expanded state by the reference numeral 401a. Pressurized fluid enters space 303 through lines 304 and 308 and valve 306 and the use of such pressurized fluid effects the expansion and contraction of the bladder 401. Similarly, the bladder in the footer is indicated by the reference numeral 421 in its contracted state and by the reference numeral 421a in its expanded state. Pressurized fluid entering and leaving space 323 through lines 324 and 328 and valve 326 effects the expansion and contraction of the bladder 421.

The use of an expanded header while the fluid mixture, purge fluid, flush fluid or regenerating fluid enters the process microchannels 104 provides an even or substantially even distribution of fluid throughout the microchannels. The use of an expanded footer during the purge, flush or regeneration steps of the inventive process aids in providing for a rapid removal or rapid flush of fluid from the process microchannels. On the other hand, during the sorption and desorption steps of the inventive process the bellow or expanded bladder in the header are contracted to reduce the size of the dead zones in the header and the footer and thereby enhance the purity of the fluid component being separated using the inventive process. In one embodiment, the use of the expandable bellows 301 and 321 or the expandable bladders 401 and 421 can provide for a total dead zone volume while in the expanded state of about 10 to about 40%, and in one embodiment about 20 to about 40% of the internal volume of the process microchannels 104. On the other hand, when in the contracted state the dead zone volume may be in the range of up to about 10%, and in one embodiment up to about 5% of the internal volume of the process microchannels 104.

Figure 5:
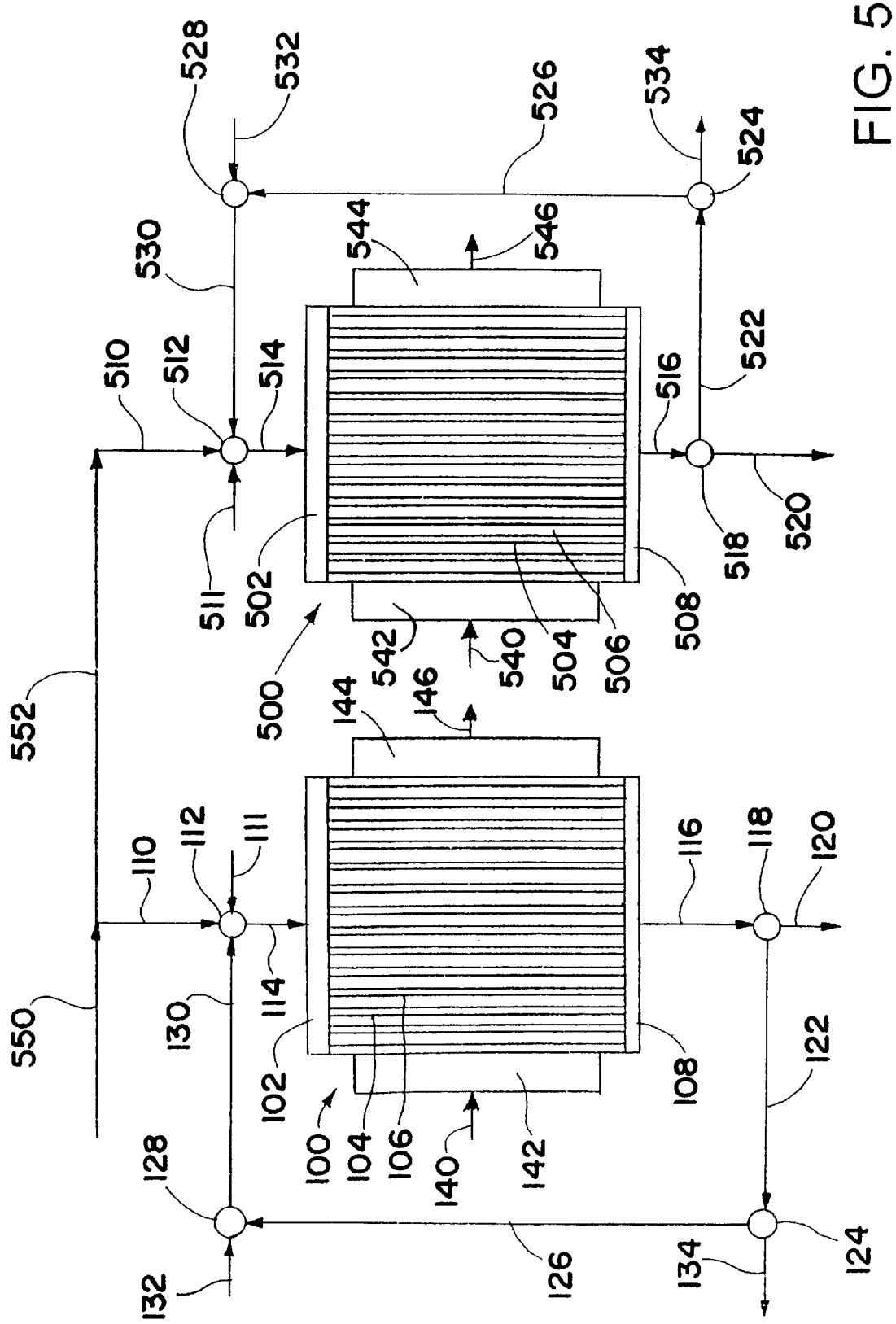
FIG. 5 is a flow sheet illustrating another alternate embodiment of the inventive process.

The process illustrated in FIG. 5 involves the use of two microchannel separators 100 and 500 operating in parallel. This arrangement allows for a sequential operation wherein step (A) may be conducted in microchannel separator 100 while step (B) is conducted in microchannel separator 500, and vice versa. Microchannel separator 100 is the same as described above with reference to FIG. 1. Microchannel separator 500 is the same as or similar to microchannel separator 100 in construction and operation. Microchannel separator 500 is comprised of a header 502, a plurality of process microchannels 504 which contain a sorption medium 506, and a footer 508. As with microchannel separator 100, there is practically no limit to the number of process microchannels 504 that can be used in microchannel separator 500. For example, the microchannel separator 500 may contain two, three, four, five, six, eight, ten, twenty, fifty, hundreds, thousands, tens of thousands, hundreds of thousands, millions, etc., of the process microchannels 504. Each of the microchannels has at least one internal dimension of height or width of up to about 2 mm, and in one embodiment from about 0.1 to about 1.5 mm, and in one embodiment from about 0.5 to about 1 mm. The combined internal volume of the header 502 and the footer 508 may be up to about 40% of the total internal volume of the process microchannels 504, and in one embodiment from about 1 to about 30%, and in one embodiment from about 1 to about 20%, and in one embodiment about 1 to about 10%, and in one embodiment about 1 to about 5%. As with microchannel separator 100, this relatively low volume of dead zone space enables the production of a more complete fluid separation and thus a purer fluid component product.

The process illustrated in FIG. 5 involves the use of process steps (I)(A), (I)(B), (II)(A) and (II)(B). Step (I)(A) and (I)(B) may be conducted in the same manner as steps (A) and (B) described above with reference to FIG. 1. The only difference is that step (I)(A) initially involves flowing only a portion of the fluid mixture through line 550 to line 110. From that point on the above description of steps (A) and (B) with reference to FIG. 1 are applicable to the description of steps (I)(A) and (I)(B) with reference to FIG. 5.

Step (II)(A) of the process illustrated in FIG. 5 may be conducted by flowing another portion of the fluid mixture through line 550 to line 552, through line 552 to line 510, through line 510 to valve 512, through valve 512 to line 514 and through line 514 to microchannel separator 500. In microchannel separator 500 the fluid mixture flows into header 502, process microchannels 504 in contact with sorption medium 506, and footer 508. The fluid mixture is maintained in header 502, process microchannels 504 and footer 508 at a desired temperature and pressure to permit at least part of the fluid component to be sorbed by the sorption medium 506. This process may be continued until a desired loading of the sorption medium 506 by the fluid component is achieved. The desired loading level may be in the range of about 0.0001 to about 1 gram of fluid component per gram of sorption medium, and in one embodiment about 0.001 to about 0.1 gram of fluid component per gram of sorption medium. At the end of this sorption step a purging fluid flows through line 511 to valve 512, through valve 512 to line 514 and from line 514 to the header 502, process microchannels 504 and footer 508 to displace the non-sorbed part of the fluid mixture from the microchannel separator 500. The purging fluid and non-sorbed part of the fluid mixture flow from the header 502, the process microchannels 504 and the footer 508 through line 516 to valve 518, through valve 518 to line 520 and through line 520 out of the system.

The sorption part of step (II)(A) may be conducted at a temperature of about −40° C. to about 150° C., and in one embodiment about 20 to about 100° C. The pressure within the process microchannels 504 during the sorption part of step (II)(A) may range from about 0.01 to about 50 atmospheres, and in one embodiment about 0.1 to about 10. The period of time for the sorption to occur may range from about 0.0001 to about 100 seconds, and in one embodiment about 0.001 to about 10 seconds.

The purging fluid may be at a temperature of about 0 to about 200° C., and in one embodiment about 40 to about 150° C. during step (II)(A). In one embodiment, the temperature of the purging fluid is about 1 to about 100° C. above the temperature used during the sorption part of step (II)(A), and in one embodiment 10 to about 80° C. above the step (II)(A) sorption temperature. The residence time for the purging fluid in the process microchannels 504 may range from 0.0001 to about 100 seconds, and in one embodiment 0.001 to about 10 seconds. Examples of purging fluids that may be used include helium, argon, carbon dioxide, water vapor, nitrogen, and mixtures of two or more thereof. As indicated above, if the separation that is effected during step (II)(A) is oxygen from air, nitrogen would not be recommended as the purging fluid.

Step (II)(B) involves desorbing the sorbed fluid component from the sorption medium 506. This desorption step may be conducted by increasing or decreasing the temperature of the sorption medium 506 and/or increasing or decreasing the pressure within the process microchannels 504 relative to the temperature and pressure used during the sorption part of step (II)(A). The pressure used during step (II)(B) may be the same as the pressure used during the sorption part of step (II)(A). In one embodiment, step (II)(B) is conducted at a higher temperature and a lower pressure than the sorption part of step (II)(A). The temperature used in step (II)(B) may be increased by about 10 to about 200° C., and in one embodiment about 20 to about 150° C., above the temperature that is used during the sorption part of step (II)(A). The temperature may be raised to a level of about 80 to about 200° C., and in one embodiment about 100 to about 150° C. during step (II)(B). Alternatively, the temperature used in step (II)(B) may be decreased by about 10 to about 150° C., and in one embodiment about 40 to about 100° C., below the temperature that is used during the sorption part of step (II)(A). The temperature may be decreased to a level of about 20 to about 200° C., and in one embodiment about 50 to about 100° C. during step (B). The pressure within the process microchannels 504 during step (II)(B) may be reduced by about 0.001 to about 10 atmospheres, and in one embodiment about 0.1 to about 1 atmosphere, below the pressure used during the sorption part of step (II)(A). The pressure may be reduced to a level of about 0.1 to about 10 atmospheres, and in one embodiment 1 to about 5 atmospheres during step (II)(B) of the inventive process. Alternatively, the pressure within the process microchannels 504 during step (II)(B) may be raised by about 0.01 to about 10 atmospheres, and in one embodiment about 0.1 to about 5 atmospheres above the pressure used during the sorption part of step (II)(A). The pressure during step (II)(B) may be raised to a level of 0.1 to about 10 atmospheres, and in one embodiment 1 to about 5 atmospheres. The percentage of sorbed material that is desorbed during this step (II)(B) may range from about 1 to about 100%, and in one embodiment about 10 to about 80%. The cycle time for performing this desorbing step may range from about 0.0001 to about 100 seconds, and in one embodiment about 0.001 to about 10 seconds.

During step (II)(B) a flush fluid flows through the process microchannels 504 to displace the desorbed fluid component from the process microchannels 504. The flow of the flush fluid may be simultaneous with the above-described desorption, or it may occur subsequent to such desorption. The start of the flow of the flush fluid may be delayed until after the start of the desorption step and then continued after the end of the desorption step. The flush fluid flows through line 532 to valve 528, through valve 528 to line 530, through line 530 to valve 512, through valve 512 to line 514, and through line 514 into microchannel separator 500. Within the microchannel separator 500 the flush fluid flows from header 502 through process microchannels 504 in contact with sorption medium 50 to footer 508. The flush fluid flows from footer 508 through line 516 to valve 518, through valve 518 to line 522, through line 522 to valve 524 and from valve 524 to and through line 534 and from line 534 to a collection vessel (not shown in the drawings). The flush fluid may be the same as the fluid component being separated (for example $O_2$) or it may be a fluid that is non-reactive with the fluid component being separated. The non-reactive fluids may be the same as indicated above. Part of the flush fluid may be recirculated to the microchannel separator 500 by flowing it through line 526 to valve 528, through valve 528 to line 530, through line 530 to valve 512, through valve 512 to and through line 514 to microchannel separator 500. This process may be continued until a desired removal of the fluid component from the microchannel separator 500 is achieved.

During step (II)(B) a flush fluid flows through the process microchannels 504 to displace the desorbed fluid component from the process microchannels 504. The flow of the flush fluid may be simultaneous with the above-described desorption, or it may occur subsequent to such desorption. The start of the flow of the flush fluid may be delayed until after the start of the desorption step and then continued after the end of the desorption step. The flush fluid flows through line 532 to valve 528, through valve 528 to line 530, through line 530 to valve 512, through valve 512 to line 514, and through line 514 into microchannel separator 500. Within the microchannel separator 500 the flush fluid flows from header 502 through process microchannels 504 in contact with sorption medium 50 6 to footer 508. The flush fluid flows from footer 508 through line 516 to valve 518, through valve 518 to line 522, through line 522 to valve 524 and from valve 524 to and through line 534 and from line 534 to a collection vessel (not shown in the drawings). The flush fluid may be the same as the fluid component being separated (for example $O_2$) or it may be a fluid that is non-reactive with the fluid component being separated. The non-reactive fluids may be the same as indicated above. Part of the flush fluid may be recirculated to the microchannel separator 500 by flowing it through line 526 to valve 528, through valve 528 to line 530, through line 530 to valve 512, through valve 512 to and through line 514 to microchannel separator 500. This process may be continued until a desired removal of the fluid component from the microchannel separator 500 is achieved.

At the end of step (II)(B) the sorption medium 506 may be regenerated. This may be done by flowing a regenerating fluid through the process microchannels 504 in contact with the sorption medium 506. The regenerating fluid may be air, nitrogen, argon, carbon dioxide, helium, water vapor. The regenerating fluid may flow from the header 502 through the process microchannels 504 and then to the footer 508, or in the opposite direction from the footer 508 through the process microchannels 504 to the header 502. The temperature of the regenerating fluid may be from about 0 to about 200° C., and in one embodiment about 20 to about 150° C. In one embodiment, the temperature of the regenerating fluid may be about 20 to about 100° C., and in one embodiment about 40 to about 100° C. below the temperature of the flush fluid used during step (II)(B). The pressure within the process microchannels 504 during this regeneration step may range from about 0.001 to about 50 atmospheres, and in one embodiment about 1 to about 10 atmospheres. The residence time of the regenerating fluid in the process microchannels 504 may range from about 0.0001 to about 100 seconds, and in one embodiment about 0.001 second to about 10 seconds.

During the operation of steps (I)(A), (I)(B), (II)(A) and (II)(B) of the process illustrated in FIG. 5, the microchannel separators 100 and 500 may be cooled or heated using heat exchange microchannels or resistance heating in the same manner as described above. Referring to FIG. 5, during the operation of steps (II)(A) and (II)(B) a heat exchange fluid flows from the exchange header 542 through heat exchange microchannels to heat exchange footer 544. The heat exchange microchannels are aligned in a cross-flow direction relative to the process microchannels 504 as indicated by arrows 540 and 546. The heat exchange fluid may be recirculated using known techniques. Alternatively, the heat exchange microchannels may be oriented to provide for flow of the heat exchange fluid in a cocurrent or counter current direction relative to the direction of fluid flowing through the process microchannels 504. The heat exchange microchannels may have the same dimensions and be made of the same materials as described above.

Figure 6:
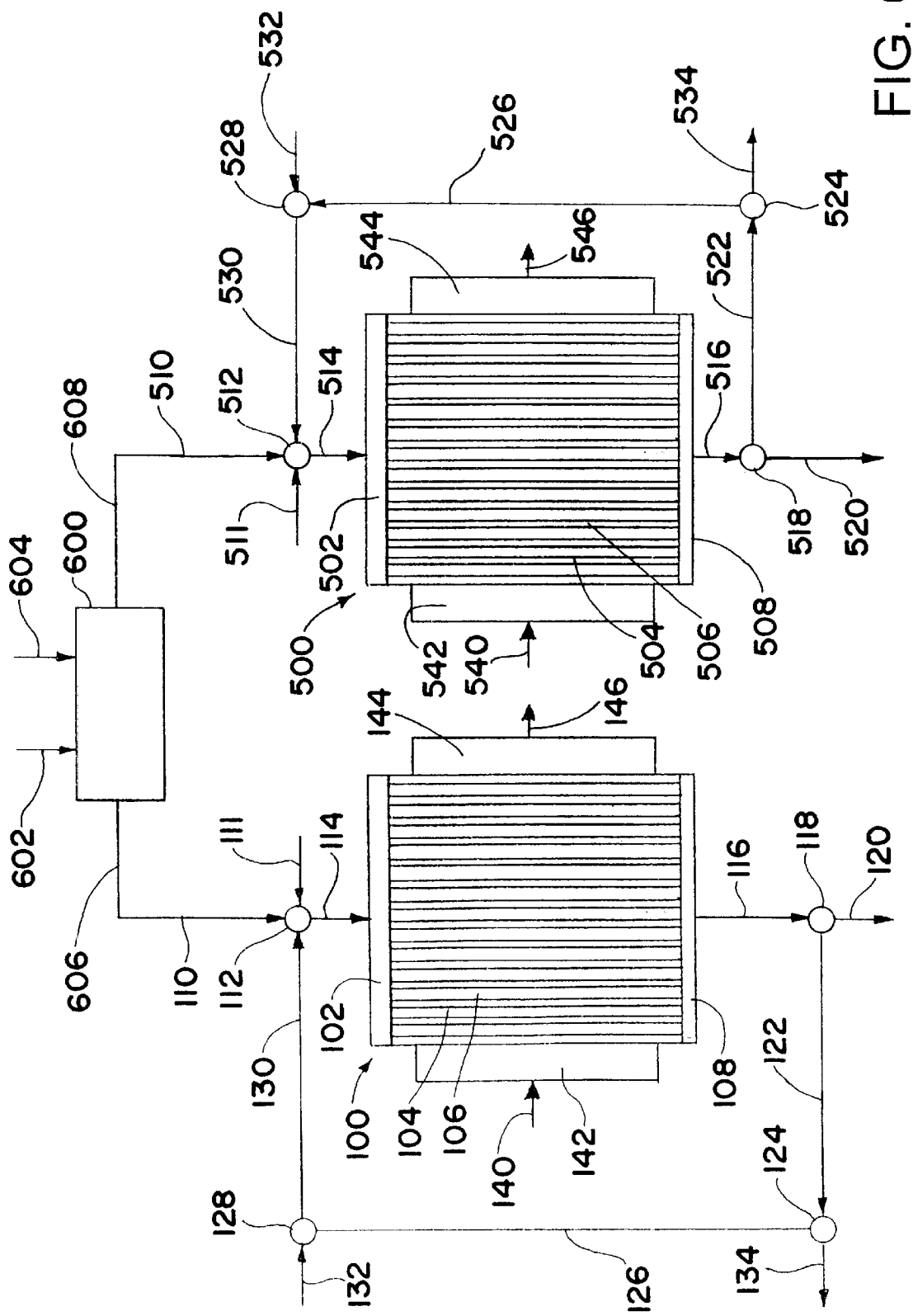
FIG. 6 is a flow sheet illustrating another alternate embodiment of the inventive process.

The processes illustrated in FIG. 6 is similar to the process illustrated in FIG. 5 wherein microchannel separators 100 and 500 are operated in parallel. The difference between the two processes is that lines 550 and 552 in FIG. 5 are replaced by separator 600 and lines 602, 604, 606 and 608 in FIG. 6. The separator 600 may be any conventional separator including a microchannel separator such as microchannel separator 100. Other examples of suitable separators include membrane, distillation, absorption, adsorption, and the like. The process illustrated in FIG. 6 is particularly suitable for performing separations that are difficult to do in one step. An example of such a separation is the separation of an olefin from a mixture containing the olefin and a paraffin. The separation of ethylene from ethane may be effected using this process. The process involves flowing a first fluid mixture containing a first fluid component and a second fluid component (e.g., ethylene and ethane) through line 602 to separator 600. A third fluid component (e.g., nitrogen) flows through line 604 into separator 600 where a second fluid mixture (e.g., ethylene, ethane and nitrogen) is formed. In separator 600 the second fluid mixture is divided into a third fluid mixture (e.g., ethylene and nitrogen) and a fourth fluid mixture (e.g., ethane and nitrogen), the third fluid mixture containing the first fluid component (e.g., ethylene) and the third fluid component (e.g., nitrogen), and the fourth fluid mixture containing the second fluid component (e.g., ethane) and the third fluid component (e.g., nitrogen). The third fluid mixture flows through line 606 to line 110, from line 110 through valve 112 to line 114, and from line 114 into the microchannel separator 100 wherein the first fluid component and the third fluid component are separated in the same manner as described above. Similarly, the fourth fluid mixture flows from separator 600 through line 608 to line 510, from line 510 through valve 512 to line 514, and from line 514 into microchannel separator 500 wherein the second fluid component is separated from the third fluid component in the same manner as described above.

Figure 7:
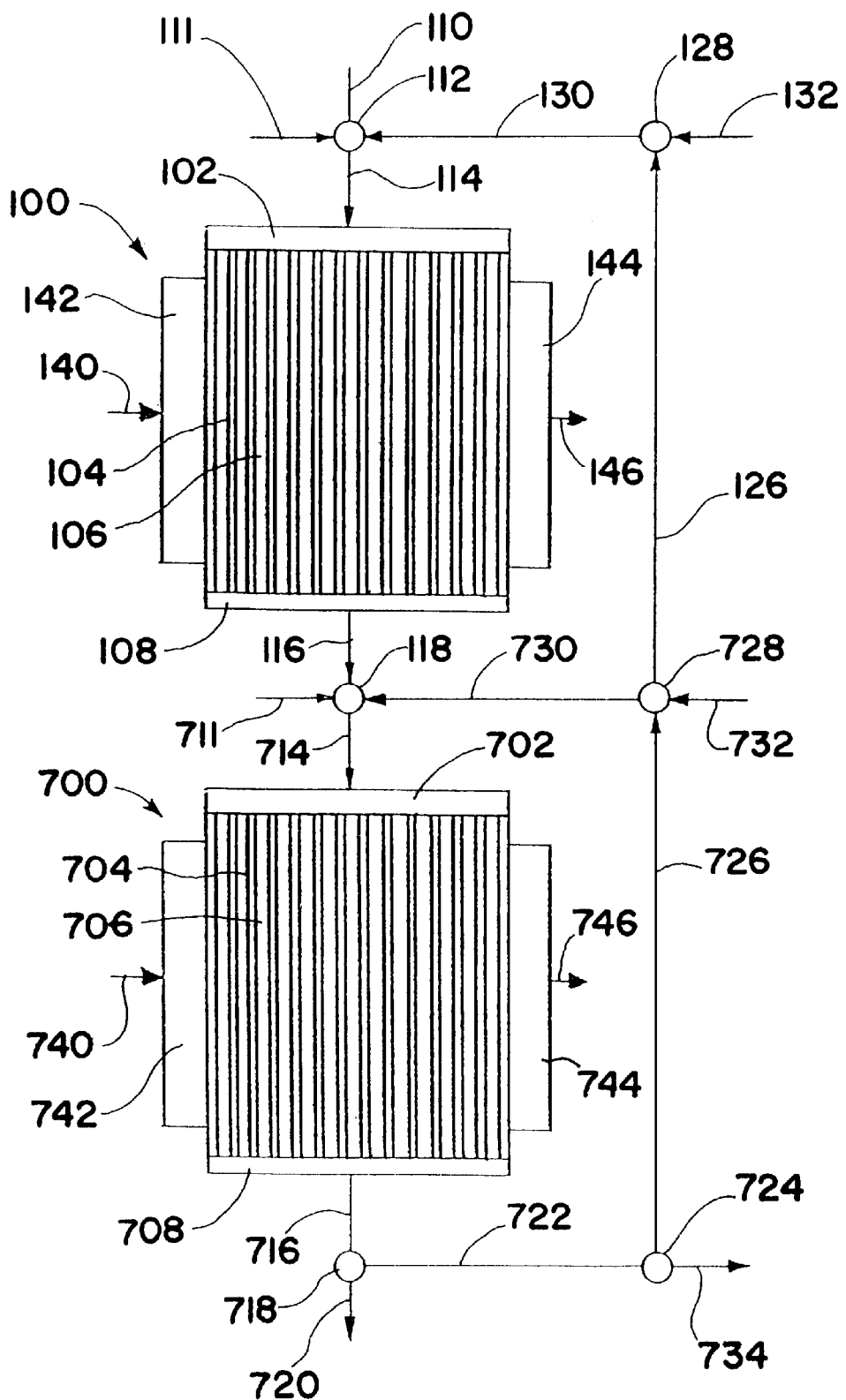
FIG. 7 is a flow sheet illustrating another alternate embodiment of the inventive process.

The process illustrated in FIG. 7 involves the use of two microchannel separators 100 and 700 operating in series. This arrangement allows for a sequential operation wherein steps (A) and (B) may be conducted in microchannel separator 100 to provide a first separation of the fluid component from the fluid mixture, and then repeated in microchannel separator 700 to provide a second separation to provide a more complete separation of the product fluid component from the fluid mixture. Microchannel separator 100 is the same as described above with reference to FIG. 1. Microchannel separator 700 is the same as or similar in construction and operation to microchannel separator 100. Microchannel separator 700 is comprised of a header 702, a plurality of process microchannels 704 which contain a sorption medium 706, and a footer 708. As with microchannel separator 100, there is practically no limit to the number of process microchannels 704 that can be used in microchannel separator 700. For example, the microchannel separator 700 may contain two, three, four, five, six, eight, ten, twenty, fifty, hundreds, thousands, tens of thousands, hundreds of thousands, millions, etc., of the process microchannels 704. Each of the microchannels has at least one internal dimension of height or width of up to about 2 mm, and in one embodiment from about 0.1 to about 1.5 mm, and in one embodiment from about 0.5 to about 1 mm. The combined internal volume of the header 702 and the footer 708 may be up to about 40% of the total internal volume of the process microchannels 704, and in one embodiment about 1 to about 30%, and in one embodiment from about 1 to about 20%, and in one embodiment about 1 to about 10%, and in one embodiment about 1 to about 5%. As with microchannel separator 100, this relatively low volume of dead zone space enables the production of a more complete fluid separation and thus a purer fluid component product.

The process illustrated in FIG. 7 involves the use of process steps (I)(A), (I)(B), (II)(A) and (II)(B). Step (I)(A) and (I)(B) may be conducted in the same manner as steps (A) and (B) described above with reference to FIG. 1. The difference is that the part of the fluid mixture that is not sorbed during step (A) in microchannel separator 100 is subjected to a further sorption/desorption in microchannel separator 700.

Step (II)(A) of the process illustrated in FIG. 7 may be conducted by flowing the non-sorbed part of the fluid mixture removed from the microchannel separator 100 through line 116 to valve 118, through valve 118 to line 714 and through line 714 to microchannel separator 700. In microchannel separator 700 the fluid mixture flows into header 702, process microchannels 704 in contact with sorption medium 706, and footer 708. The fluid mixture is maintained in header 702, process microchannels 704 and footer 708 at a desired temperature and pressure to permit at least part of the fluid component to be sorbed by the sorption medium 706. This process may be continued until a desired loading of the sorption medium 706 by the fluid component is achieved. The desired loading level may be in the range of about 0.0001 to about 1 gram of fluid component per gram of sorption medium, and in one embodiment about 0.001 to about 0.1 gram of fluid component per gram of sorption medium. At the end of this sorption step a purging fluid flows through line 711 to valve 118, through valve 118 to line 714 and from line 714 to the header 702, process microchannels 704 and footer 708 to displace the non-sorbed part of the fluid mixture from the microchannel separator 700. The purging fluid and non-sorbed part of the fluid mixture flow from the header 702, the process microchannels 704 and the footer 708 through line 716 to valve 718, through valve 718 to line 720 and through line 720 out of the system.

The sorption part of step (II)(A) may be conducted at a temperature of about −40° C. to about 200° C., and in one embodiment about −40° C. to about 100° C., and in one embodiment about 0 to about 50° C. The pressure within the process microchannels 704 during the sorption part of step (II)(A) may range from about 0.01 to about 50 atmospheres, and in one embodiment about 0.1 to about 10. The period of time for the sorption to occur may range from about 0.001 to about 100 seconds, and in one embodiment about 0.1 to about 10 seconds.

The purging fluid flowing through microchannels 704 may be at a temperature of about 0 to about 200° C., and in one embodiment about 40 to about 150° C. during step (II)(A). In one embodiment, the temperature of the purging fluid is about 10 to about 100° C. above the temperature used during the sorption part of step (II)(A), and in one embodiment 20 to about 100° C. above the step (II)(A) sorption temperature. The residence time for the purging fluid in the process microchannels 704 may range from 0.0001 to about 100 seconds, and in one embodiment 0.001 to about 10 seconds. Examples of purging fluids that may be used include helium, argon, carbon dioxide, water vapor, nitrogen, and mixtures of two or more thereof. As indicated above, If the separation that is effected during step (II)(A) is oxygen from air, nitrogen would not be recommended as the purging fluid.

Step (II)(B) involves desorbing the sorbed fluid component from the sorption medium 706. This desorption step may be conducted by increasing or decreasing the temperature of the sorption medium 706 and/or increasing or decreasing the pressure within the process microchannels 704 relative to the temperature and pressure used during the sorption part of step (II)(A). The pressure used during step (II)(B) may be the same as the pressure used during the sorption part of step (II)(A). In one embodiment, step (II)(B) is conducted at a higher temperature and a lower pressure than the sorption part of step (II)(A). The temperature used in step (II)(B) may be increased by about 10 to about 200° C., and in one embodiment about 20 to about 100° C., above the temperature that is used during the sorption part of step (II)(A). The temperature may be raised to a level of about 40 to about 200° C., and in one embodiment about 80 to about 150° C. during step (II)(B). Alternatively, the temperature used in step (II)(B) may be decreased by about 10 to about 100° C., and in one embodiment about 40 to about 200° C., below the temperature that is used during the sorption part of step (II)(A). The temperature may be decreased to a level of about 40 to about 20° C., and in one embodiment about 80 to about 150° C. during step (B). The pressure within the process microchannels 704 during step (II)(B) may be reduced by about 0.001 to about 10 atmospheres, and in one embodiment about 0.1 to about 1 atmosphere, below the pressure used during the sorption part of step (II)(A). The pressure may be reduced to a level of about 0.001 to about 10 atmospheres, and in one embodiment 0.1 to about 1 atmosphere during step (II)(B) of the inventive process. Alternatively, the pressure within the process microchannels 704 during step (II)(B) may be raised by about 0.001 to about 10 atmospheres, and in one embodiment about 0.1 to about 10 atmospheres above the pressure used during the sorption part of step (II)(A). The pressure during step (II)(B) may be raised to a level of 0.001 to about 50 atmospheres, and in one embodiment 0.1 to about 10 atmospheres. The percentage of sorbed material that is desorbed during this step (II)(B) may range from about 1 to about 100%, and in one embodiment about 5 to about 80%. The cycle time for performing this desorbing step may range from about 0.01 to about 100 seconds, and in one embodiment about 0.1 to about 10 seconds.

During step (II)(B) a flush fluid flows through the process microchannels 704 to displace the desorbed fluid component from the process microchannels 704. The flow of the flush fluid may be simultaneous with the above-described desorption, or it may occur subsequent to such desorption. The start of the flow of the flush fluid may be delayed until after the start of the desorption step and then continued after the end of the desorption step. The flush fluid flows through line 732 to valve 728, through valve 728 to line 730, through line 730 to valve 118, through valve 118 to line 714, and through line 714 into microchannel separator 700. Within the microchannel separator 700 the flush fluid flows from header 702 through process microchannels 704 in contact with sorption medium 706 to footer 708. The flush fluid flows from footer 708 through line 716 to valve 718, through valve 718 to line 722, through line 722 to valve 724 and from valve 724 to and through line 734 and from line 734 to a collection vessel (not shown in the drawings). The flush fluid may be the same as the fluid component being separated (for example $O_2$) or it may be a fluid that is non-reactive with the fluid component being separated. The non-reactive fluids may be the same as indicated above. Part of the flush fluid may be recirculated to the microchannel separator 700 by flowing it through line 726 to valve 728, through valve 728 to line 730, through line 730 to valve 118, through valve 118 to and through line 714 to microchannel separator 700. This process may be continued until a desired removal of the fluid component from the microchannel separator 700 is achieved.

The flush fluid used in step (II)(B) may be at a temperature of about 0° C. to about 200° C., and in one embodiment about 20 to about 150° C. In one embodiment, the temperature of the flush fluid is about 20 to about 100° C. higher than the temperature used to desorb the fluid component during step (II)(B), and in one embodiment the flush fluid temperature is about 40 to about 100° C. above the desorption temperature. The pressure within the process microchannels during the flushing step may range from about 0.01 to about 50 atmospheres, and in one embodiment about 0.1 to about 10 atmospheres. The residence time for the flush fluid in the process microchannels 704 during step (II)(B) may range from about 0.0001 second to about 100 seconds, and in one embodiment about 0.001 second to about 10 seconds. The pressure drop for the flush fluid flowing through the process microchannels 704 during step (II)(B) may range from about 0.001 to about 10 atmospheres, and in one embodiment about 0.1 to about 1 atmosphere. The Reynolds Number for the flow of the flush fluid through the process microchannels 704 during step (II)(B) may range from about 1 to about 4000, and in one embodiment about 10 to about 1500.

At the end of step (II)(B) the sorption medium 706 may be regenerated. This may be done by flowing a regenerating fluid through the process microchannels 704 in contact with the sorption medium 706. The regenerating fluid may be air, nitrogen, carbon dioxide, helium, argon, or water vapor. The regenerating fluid may flow from the header 702 through the process microchannels 704 and then to the footer 708, or in the opposite direction from the footer 708 through the process microchannels 704 to the header 702. The temperature of the regenerating fluid may be from about 0 to about 200° C., and in one embodiment about 40 to about 100° C. In one embodiment, the temperature of the regenerating fluid may be about 10 to about 100° C., and in one embodiment about 20 to about 80° C. below the temperature of the flush fluid used during step (II)(B). The pressure within the process microchannels 704 during this regeneration step may range from about 0.01 to about 50 atmospheres, and in one embodiment about 1 to about 10 atmospheres. The residence time of the regenerating fluid in the process microchannels 704 may range from about 0.0001 to about 100 seconds, and in one embodiment about 0.001 to about 10 seconds.

During the operation of steps (I)(A), (I)(B), (II)(A) and (II)(B) of the process illustrated in FIG. 7, the microchannel separators 100 and 700 may be cooled or heated using heat exchange microchannels or resistance heating in the same manner as described above. During the operation of steps (II)(A) and (II)(B), a heat exchange fluid may flow from the exchange header 742 through the heat exchange microchannels to heat exchange footer 744. The heat exchange microchannels are aligned in a cross-flow direction relative to the process microchannels 704 as indicated by arrows 740 and 746. The heat exchange fluid may be recirculated using known techniques. Alternatively, the heat exchange microchannels may be oriented to provide for flow of the heat exchange fluid in a cocurrent or counter current direction relative to the direction of fluid flowing through the process microchannels 704. The heat exchange microchannels may have the same dimensions and be made of the same materials as described above.

In one embodiment of the invention, cylindrical header-valves may be used with multiple microchannel separators such as those depicted in FIGS. 5–7. These header-valves integrate the functions of process headering, purge headering, flush headering, and the short cycling times that are desirable for the process. In this embodiment, at least one process header, at least one purge header and at least one flush header coexist within a single cylindrical part, and feed the process microchannels in a direction outward from the cylinder. During operation, the cylinder rotates along its axis to realign the headers with different process microchannels. The result is an alternating of the headers or a changing of the fluid that flows into the process microchannels without adding time to purge out the header.

Figure 11:
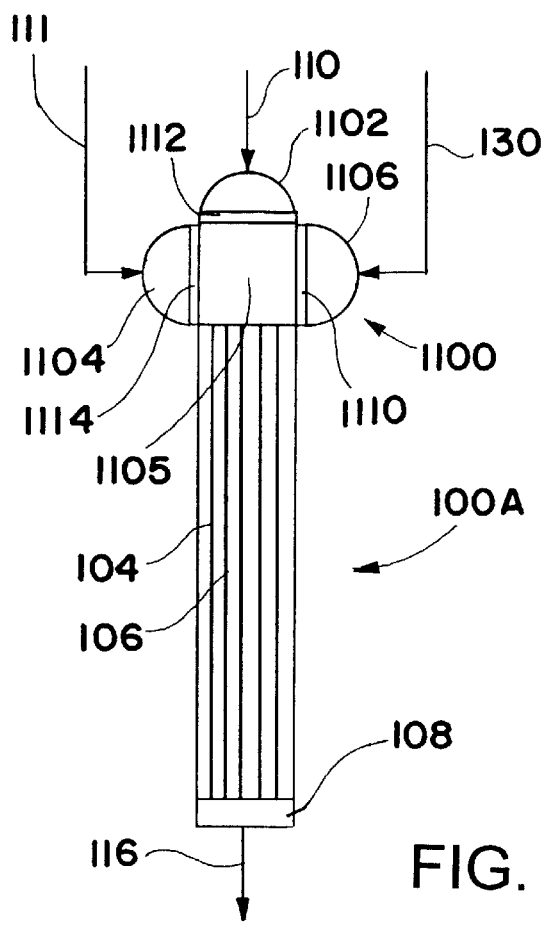
FIG. 11 is a schematic illustration of an alternate embodiment of the microchannel separator used with the inventive process, the microchannel separator including a multiple entry header.
Figure 12:
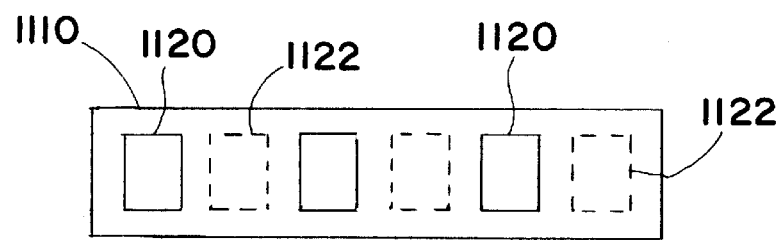
FIG. 12 is a schematic illustration of an entry gate used with the multiple entry header illustrated in FIG. 11, the gate being in the closed position.
Figure 13:
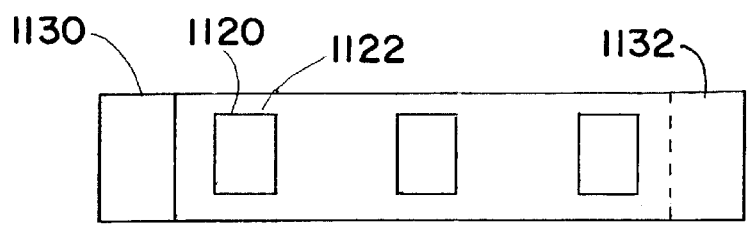
FIG. 13 is another schematic illustration of the entry gate used with the multiple header illustrated in FIG. 11, the gate being in the open position.

An alternate design for the header 102 is illustrated in FIGS. 11–13. This design involves the use of the multiple entry header 1100 depicted in FIG. 11 in place of the header 102 depicted in FIG. 1. Multiple entry header 1100 is comprised of a fluid mixture section 1102, a purging fluid section 1104 and a flush fluid section 1106. The fluid mixture entering the microchannel separator 100A flows through line 110 into the fluid mixture section 1102, from the fluid mixture section 1102 through gate 1112 into open section 1105 and from there into the process microchannels 104. The purging fluid flows through line 111 into purging fluid section 1104 and from purging section 1104 through gate 1114 into open section 1105, and from open section 1105 into the process microchannels 104. The flush fluid flows through line 130 into flush fluid section 1106, from section 1106 through gate 1110 into space 1105, and from space 1105 into the process microchannels 104. Referring to FIGS. 12 and 13, gate 1110 is comprised of two parallel gate members 1130 and 1132. Gate member 1132 slides from left to right relative to gate member 1130 which is stationary. Gate member 1130 contains holes 1122. Gate member 1132 contains holes 1120. When in the position illustrated in FIG. 12, gate 1110 is closed and therefore fluid may not flow through it. When in the position illustrated in FIG. 13, gate 1110 is in the open position with the sliding member 1132 moved to the right and holes 1120 and 1122 being aligned with each other and thereby providing an opening in the gate. Gates 1112 and 1114 are similar in design and operation to gate 1110. It will be understood by those skilled in the art that the holes 1120 and 1122 may have any desired shape and number to provide for desired flow characteristics. An advantage of the multiple entry header discussed above is that this header provides for a rapid change over from the flow of the fluid mixture to the flow of the purging fluid and the flow of the flush fluid into the process microchannels.

Figure 9:
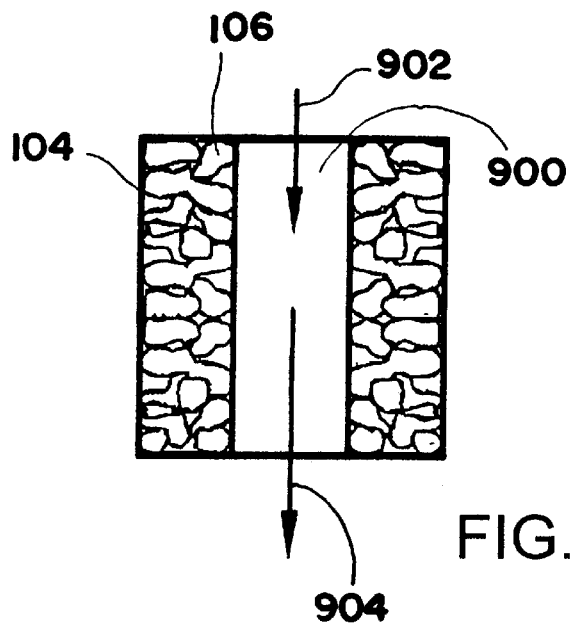
FIG. 9 is a schematic illustration of a cross-sectional view of a process microchannel used with the inventive process, the process microchannel containing a sorption medium having a flow-by configuration.
Figure 10:
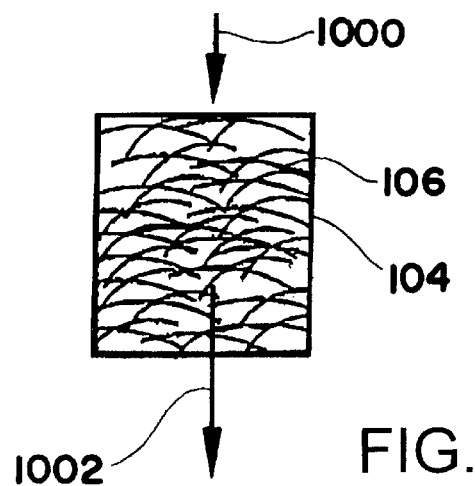
FIG. 10 is a cross-sectional view of an alternate embodiment of the process microchannel used with the inventive process, the process microchannel containing a sorption medium having a flow-through configuration.

The sorption medium may have any size and geometric configuration that fits within the process microchannels. The sorption medium may be in the form of particulate solids (e.g., pellets, powder, and the like) having a median particle diameter of about 1 to about 1000 μm, and in one embodiment about 10 to about 500 μm, and in one embodiment about 25 to about 250 μm. The sorption medium may be comprised of a porous structure such as a foam, felt, wad or a combination thereof. The term "foam" is used herein to refer to a structure with continuous walls defining pores throughout the structure. The term "felt" is used herein to refer to a structure of fibers with interstitial spaces therebetween. The term "wad" is used herein to refer to a structure of tangled strands, like steel wool. The sorption medium may have a honeycomb structure, or the structure of an insertable fin. The fin may have straight channels or may take the form of an offset strip fin. The number of fins per inch may range from about 4 to about 90. The fins may have a thickness of about 0.001 to about 0.1 inch. The sorption medium may be in the form of a flow through structure such as a foam, wad, pellet or powder, or gauze. An example of a flow-through structure is illustrated in FIG. 10. In FIG. 10, the flow-through sorption medium 106 is contained within process microchannel 104 and he fluid flows through the sorption medium as indicated by arrows 1000 and 1002. The sorption medium may be in the form of a flow-by structure such as a felt with an adjacent gap, a foam with an adjacent gap, a fin structure with gaps, a washcoat on any inserted substrate, or a gauze that is parallel to the flow direction with a corresponding gap for flow. An example of a flow-by structure is illustrated in FIG. 9. In FIG. 9, the sorption medium is contained within process microchannel 104. An open passage way 900 permits the flow of fluid through the process microchannel 104 in contact with the sorption medium 106 as indicated by arrows 902 and 904. The sorption medium may be directly washcoated on the interior walls of the process microchannels. The sorption medium may be in the form of a single piece of porous contiguous material, or many pieces in physical contact. In one embodiment, the sorption medium is comprised of a contiguous material and has a contiguous porosity such that molecules can diffuse through the sorption medium. In this embodiment, the fluids flow through the sorption medium rather than around it. In one embodiment, the cross-sectional area of the sorption medium occupies about 1 to about 99%, and in one embodiment about 10 to about 95% of the cross-sectional area of the process microchannels. The sorption medium may have a surface area, as measured by BET, of greater than about 1 $m^2/g$, and in one embodiment greater than about 10 $m^2/g$.

The sorption medium may be comprised of metal ions that are complexed (e.g., chelated) by ligands. The metal ions may complex with $O_2$, or other fluid components to be separated. The metal ions that may be used include Fe(II), Co(II), Cu(I), V(II), Mn(II), Mn(III), Cr(II), Ag(I), Rh(I), Rh(II), Rh(III), U(IV), V(IV), Ru(II), Ru(IV), Ti(III), Cr(IV), Bi(III), Ni(II), W(V), W(IV), Mo(II), Mo(III), Mo(IV), Mo(V), Mo(VI), or a combination of two or more thereof. The Roman numerals in the foregoing indicate oxidation states or valence numbers for the ions.

The ligands that may be used to complex the metal ions include dipyridyl; 2,6-[1-(2-imidazol-4-ylethylimino) ethyl pyridine]; cyclen; cyclam; a Schiff base ligand; acetyl acetonate or an oligomer or polymer thereof; a carboxylate; bipyridyl or an oligomer or polymer thereof; a porphyrin or an oligomer or polymer thereof; a corin or an oligomer or polymer thereof; a polyamide; a protein; 8-hydroxy quinoline or an oligomer or polymer thereof; ethyl cysteinate or an oligomer or polymer thereof; an N-alkyl alkanohydroxamic acid; dimethylglyoxime; sym-diethylethylenediamine; or a combination of two or more thereof. The ligands may include fluoride-carbon bonds. The ligands may be fluorinated (e.g., perfluorinated).

In one embodiment, the metal-ion ligand complex may be an axial ligand. These ligands may be suitable for oxygen purification because they tend to provide suitable bonds with oxygen to allow adduct formation, but not oxidation of the metal. Examples include imidazole, histidine amino acid, pyridine, piperidine, 4-methyl aminopyridine, 4-dimethyl aminopyridine, a nitrate, a thiocyanate, a halide, or a combination of two or more thereof.

Figure 16:
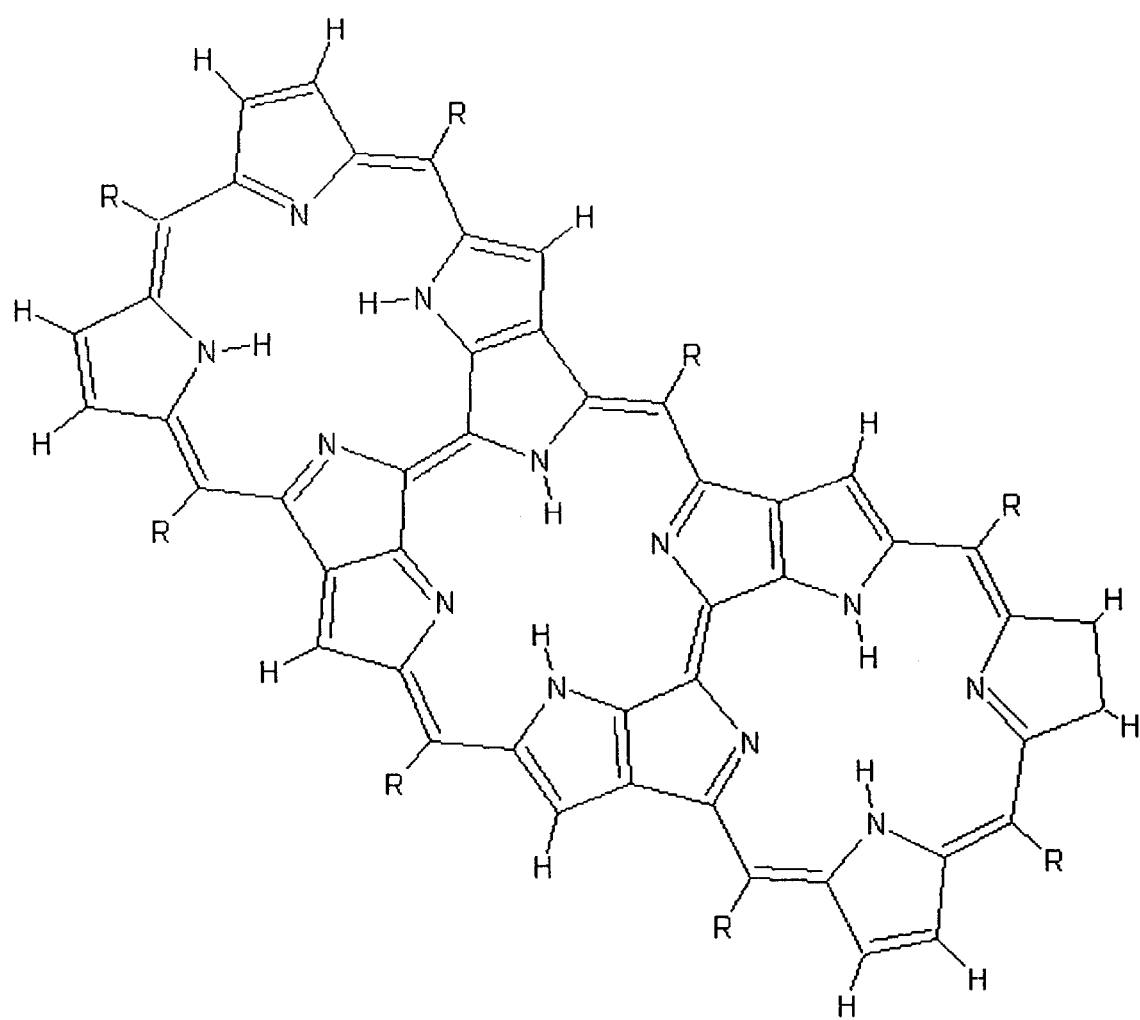
FIG. 16 is a chemical structure for a compound that may be used as a ligand for providing the sorption medium used with the inventive process.

In one embodiment, the sorption medium may be derived from a ligand having the structure illustrated in FIG. 16. The sorption medium derived from this compound might have a high $O_2$ sorption capacity with enhanced thermal conductivity for fast temperature swing operations. Note that only 3 binding site units are shown in FIG. 16. However, additional binding sites; for example, tens, hundreds, thousands, tens of thousands, hundreds of thousands, millions, etc., are possible as the rings are extended in length and width. Millions of sites are possible if the medium is stacked at the molecular scale. The structure as a whole may be in the form of particulate solids or a film. In the structure illustrated in FIG. 16, the R groups may be hydrocarbon groups or substituted hydrocarbon groups. The R groups may be aliphatic groups of at least about 4 carbons; aromatic groups; or heterocyclic groups where one or more heteroatoms (e.g., N, S, O) are present in the ring. The R group may be another ring structure, such as a modified tetraphenylporphyrin, which is also capable of binding oxygen. These second binding sites may be the same or different than the first binding site. The R groups may be aliphatic and/or aromatic hydrocarbon groups containing additional groups that increase steric bulk, weatherability, thermal stability and/or thermal conductivity. For example, these additional groups or substituents may be halides (e.g., fluoride, chloride, iodide), cyanide, carboxylates, esters, phosphines, sulfoxides, sulfones, amides, additional aliphatic groups, additional aromatic groups, nitro groups, and other $O_2$ sorbent metal chelates. The R groups may be fluorinated (e.g., perfluorinated). The R groups may be polymer groups. The R groups may contain groups such as imidazole, which provide axial groups for sorbent metal ion center sites opposite the $O_2$ binding site. The R group may contain alkenes and alkynes. Metal ions such as Fe(II), Co(II), Mn(II), or combinations thereof, may be inserted in the center of the nitrogens to complete the structure of the sorption medium.

The sorption medium that may be used may be hemoglobin; hemoerythyrin; hemocyanin; myoglobin; Co(II) (acacen); Co(II) (dry cave) (N-methyl imidazole); Fe(II) (H2TpivPP)B; Fe(II)(capped porphyrin)B; Fe(ophen)$_2^{2+}$; bis(ethyl cysteinato) oxovanadium (IV); Cu(I) (bimp); bis (dimethylglyoximato)cobalt(II); bis(histidine)cobalt(II); dinitrato-bis(sym-diethylethylenediamine)cobalt(II); dichloro-bis(sym-diethylethylenediamine)cobalt(II); [m-tetra(α,α,α,α-o-pivalamidophenyl)porphyrin]cobalt(II); [N,N-bis(salicylidene)dipropylenetriamine] cobalt(II); [2,3, 10,11,13,19-hexamethyl-3,10,14,18,21,25-hexaazabicyclo [10.7.7] hexacosa-11,13,18,20,25-hexene-κ$^4$N )cobalt(II) hexafluorophosphate;[N,N'-bis(salicylicylidene) ethylenediamine]cobalt(II); [N,N'-bis(3-methoxysalicylicylidene)ethylenediamine]cobalt(II);[N,N'-bis(salicylicylidene)tetramethylethylenediamine]cobalt(II); [N,N'-bis(3-methoxysalicylicylidene) tetramethylethylenediamine]cobalt(II); [N,N'-bis(3- isoprpoxysalicylicylidene)tetramethylethylenediamine] cobalt(II); [N,N'-bis(3-ethoxysalicylicylidene) tetramethylethylenediamine]cobalt(I );[N,N'-bis(5-methoxysalicylicylidene)tetramethylethylenediamine] cobalt(II); [N,N'-bis(5-n-butoxysalicylicylidene) tetramethylethylenediamine]cobalt(II); [N,N'-bis (salicylidene)ethylenediamine] cobalt(II)); a cobalt (II) porphyrin complex; a metal-cyanide complex encapsulated within a zeolite; a cyanocobaltate; hemoglobin, hemerythrin or hemocyanin containing a diiron(III,IV), dicopper(II) or dimanganese core; N,N'-disalicylideneethylenediamine cobalt(II); cobalt di-(3-methoxysalicylal tertbutylamine); [N,N'-bis(salicylidene)n-propyidipropylenetriamine]cobalt (II); 1-methylimidazole; 2-methylimidazole; 4dimethylaminopyridine; cyanopyridine; cobalt chelated copolymer derived from ethylene-diamine-tetraacetic acid, methyl methacrylate and butyl acrylate; bis(histidine) cobalt(II); [α-mono(o-methacrylamidophenyl)-(α,α,α-tris(o-pivalamidophenyl)porphinato]cobalt; [meso-α,α,α,α-tetrakis(o-pivalamidophenyl)porphinato]-iron(II); cobalt(II) meso-tetra-phenyl-porphyrin; cobalt(II) meso-tetrakis(2-chlorophenyl) prophyrin; cobalt(II) meso-tetrakis(4-chlorophenyl) porphyrin; cobalt(II) meso-tetrakis(4-methoxy phenyl) porphyrin; cobalt(II) meso-tetrakis(2,4-dimethoxy phenyl) porphyrin; ruthenium (III) bis (salicylaldehyde)ethylenediimine; ruthenium (III) bis (salicylaldehyde)diethlenetriimine; ruthenium (III) bis (picolinaldehyde)-o-phenylenediimine; ruthenium (III) bis (picolinaldehyde)ethylenediimine; ruthenium (III) bis (picolinaldehyde)diethylenetriimine; bis (dimethylglyoximato)nickel(II); bis(dimethylglyoximato) cobalt(II); bis(dimethylglyoximato)copper(II); dinitrato-bis (sym-diethylenediamine)cobalt(II); dithiocyanato-bis(sym-diethylethelenediamine)cobalt(II); dichloro-bis(sym-diethylethylenediamine)cobalt(II); cobalt di-(salicylal-3,3'-diimino-di-n-propylamine; N,N'-disalicyclidene ethylene diamine cobalt (II); N,N'-ethylene-bis(5-nitro-salicyliden-iminato) cobalt(II), or a combination of two or more thereof.

The sorption medium may be inorganic. Examples of inorganic sorption mediums that may be used include $Sb_2O_5$, AgO, PtO, $CrO_2$, PbO, HgO, $Cu_2O$, MnO, $Mn_2O_3$, $Bi_2O_4$, NiO, $NiO_2$, $Cu_2O_3$, SnO, $SnO_2$, $WO_2$, $WO_3$, $W_2O_5$, perfluorinated film, Pt/γ-alumina, Fe/γ-alumina, Cu/γ-alumina, Zn/γ-alumina, Co/γ-alumina, zeolite, or a combination of two or more thereof. Included in this group are metal cyanide oligomers and polymers. These include the oligomers and polymers represented by the formulae $[Cu(I)(CN)_x]_n$, $[Fe(II)(CN)_y]_n$, or $[Co(II)(CN)_y]_n$, wherein x is 3; y is 5; and n is a number that is at least 2, and in one embodiment is in the range of about 2 to about 16,500, and in one embodiment about 1000 to about 10,000.

The sorption medium may comprise silver, gold, platinum, palladium, nickel, zeolite, silica gel, or a combination of two or more thereof.

In one embodiment, the sorption medium comprises a reactive complexation sorbent that forms a reversible chemical complex with a fluid component at a relatively high temperature wherein the fluid component is sorbed by the surface of the sorption medium. At a lower temperature the chemical reaction is reversed and the complexed fluid is recovered in a more purified form.

The sorption medium may comprise an antioxidant. Examples include secondary amines, phenolic phosphates, phosphites, phenolics, bisphenolics, hydroxylamines, olefinic carboxylates, amino carboxylates (e.g., ethylene diamine tetracetic acid and salts thereof), tocopherol, di-tertiarybutyl-p-cresol, stannous salts, stannous oxides, sorbate, polysorbate, or a combination of two or more thereof.

The sorption medium may be formed on a support. The support may be a silica gel, foamed copper, sintered stainless steel fiber, alumina, poly(methyl methacrylate), polysulfonate, poly(tetrafluoroethylene), iron, nickel sponge, nylon, polyvinylidene difluoride, polypropylene, polyethylene, polyethylene ethylketone, polyvinyl alcohol, polyvinyl acetate, polyacrylate, polymethylmethacrylate, polystyrene, polyphenylene sulfide, polysulfone, polybutylene, or a combination of two or more thereof.

In one embodiment, the sorption medium may be comprised of a lacunar cobalt complex such as described in U.S. Pat. No. 4,680,037. Briefly, these complexes may be represented by the formula

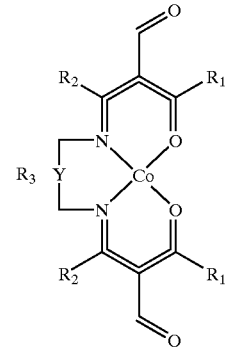

wherein each $R_1$ is independently hydrogen, a phenyl or a $C_1-C_6$ alkyl group; each $R_2$ is independently hydrogen or a $C_1-C_6$ alkyl group; $R_3$ is a $C_4-C_{30}$ hydrocarbyl radical connecting the two carbonyl carbons; and Y is o-phenylene, $-CH_2)_a$ wherein "a" is 2 or 3, $-CH_2)_bN-R_4-CH_2)_c$, wherein "b" and "c" are independently 2 or 3 and $R_4$ is hydrogen or a $C_1-C_{12}$ alkyl group. This patent is incorporated herein by reference for its disclosure of the foregoing complexes.

In one embodiment, the sorption medium may be comprised of a pillared cobalt complex such as described in U.S. Pat. No. 4,735,634. Briefly, these complexes may be represented by the formula

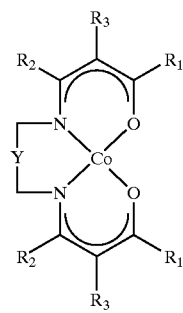

wherein each $R_1$ is independently, a phenyl or a $C_1-C_6$ alkyl group; each $R_2$ is independently hydrogen, a phenyl, or a $C_1-C_6$ alkyl group; $R_3$ is either N-succinimido substituted with a $C_3$ or greater hydrocarbon functionality at the carbon atoms α to the imido carbonyl carbons, or a carbonyl functionality having a $C_1$ greater hydrocarbon substituent with the proviso that if said substituent is methyl, $R_2$ cannot be hydrogen; and Y is 0-phenylene, $-CH_2-_a$, wherein "a" is 2 or 3, $-CH_2-_bNR_4-CH_2-_c$, wherein "b" and "c" are independently 2 or 3 and $R_4$ is hydrogen or a $C_1-C_{12}$ alkyl group. This patent is incorporated herein by reference for its disclosure of the foregoing complexes.

In one embodiment, the sorption medium may be comprised of a salt of a cationic-metal dry cave complex such as described in U.S. Pat. No. 4,888,032. Briefly, these complexes ma y be represented by the formula

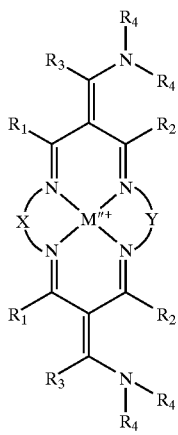

in which M is Co, Fe, Cr or Mn, X, Y, $R_1$, $R_2$ and $R_4$ are hydrogen, alkyl or substituted groups, and the two $R_3$ groups and/or the two $R_6$ groups form an organic bridging group, and derivatives of these compounds having various axial ligands attached to the metal atom. This patent is incorporated herein by reference for its disclosure of the foregoing complexes.

EXAMPLE 1

A sorption medium, which is [meso-α,α,α,α-tetrakis(o-pivalamidophenyl)porphinato]-iron (II), is tested for oxygen recovery from air using a Schlenk Line glass manifold system equipped with a Clark type oxygen sensing electrode capable of detecting oxygen in the ppm range to percent levels, an oil bubbler to ensure the system is at atmospheric pressure, and a helium ultra high purity (UHP) source. A two level calibration is performed on the oxygen sensor using helium (zero oxygen) and a calibration gas (0.998 mol % oxygen in nitrogen). The sorption medium, 0.57 g, is placed in a Schlenk sample vessel and cooled to 0.0° C. while in contact with air. The sample vessel is attached to the manifold system and cooled further with liquid nitrogen (–196° C.).

With the sorption medium isolated from the oxygen sensor, the system is purged of air using UHP helium. Once the oxygen level in the manifold system drops to zero, helium flow (1.0 cc/sec) is passed through the sample vessel to purge excess air from the vessel. After an initial increase, the oxygen levels decrease to a value of 0.857 mol % where it levels off. The liquid nitrogen is removed and the sample is heated using a circulating water bath under a flow of helium. The sample is heated to 22° C. and the released $O_2$ is measured. The temperature is increased to 80° C. No additional release of $O_2$ is observed. The release of oxygen is 4.11 vol %. The $O_2$ sorption medium loading capacity is 5.7 mg $O_2$/gm sorbent.

EXAMPLE 2

The procedure of Example 1 is repeated. The leveling off observed in Example 1 is again observed in this test, where a stable oxygen concentration of 0.858 mol % is obtained. This result indicates that the sorption medium (at –196° C.) is losing oxygen to the helium purge gas phase at a steady-state rate because of the low oxygen partial pressure provided by the helium purge stream. The liquid nitrogen is removed and the sample is heated using a circulating water bath. The $O_2$-loaded sorption medium is heated to –0.6° C. under a 0.5 cc/sec helium flow and assayed by in-line $O_2$ sensor. The release of $O_2$ is 21.54 vol % when collected in a stream at a flow rate of 0.50 ml/sec. The $O_2$ sorption medium loading capacity is 14.9 mg $O_2$/gm sorbent.

EXAMPLE 3

The procedure used in Example 2 is performed three more times, except as a closed system during the $O_2$ desorption step. The higher temperature does not result in further desorption of oxygen, indicating that oxygen is completely removed at low $P_{O2}$ values. The third experiment involves the use of the sorption medium used in Example 1 and a closed system; once the system is purged, the system is sealed and the sample heated to –1.9° C. The amount of oxygen desorbed from the sorption medium results in an increase in oxygen content of 3.76 mol %. This increase occurs over a five-minute period, then remains constant for over 150 minutes indicating no leaks are present in the closed system. The first of these three trials is analyzed in a batch mode (no He flow through with desorption at 22.0° C.). The following results are obtained.

| Results | Input Parameters: |
|---|---|
| $O_2$ = 3.76 mol % | Vol = 50 cc |
| Total moles gas = 0.0021 moles | R = 82.06 Cal/deg-mmole |
| Total mmoles $O_2$ = 0.08 mmole | T = 295.15° K. |
| Weight of $O_2$ = 2.49 mg | P = 1 Atm |
| Sorption medium weight = 0.5725 gram | |
| Sorption medium capacity = 4.34 mg. $O_2$/g | |

EXAMPLE 4

A process microchannel containing a sorption medium is thermally cycled over a 20° C. temperature range in less than 10 seconds. The apparatus consists of process microchannels containing a powdered sorption medium interleaved with a series of heat exchange microchannels containing a cooling fluid. A microchannel sorption medium containing a center resistance heater of two nichrome strips in parallel, each 0.018 cm thick, 1.27 cm wide, and 7.6 cm long with electrical resistance 0.5Ω/m and coated with 0.064 mm of Kapton tape (McMaster-Carr Supply Company), is flanked by 0.635 mm thick sorption medium beds of 2.39 cm width and 4.57 cm length. The sorption medium material is fine powder (<90μ) 5,10,15,20-tetraphenyl-21H,23H-porphine cobalt(II) supplied by Sigma-Aldrich. The sorption medium is mixed with inert 25% (vol) diamond particles of two sizes: 15% (vol) 70/80 mesh and 10% (vol) 170/200 mesh (Man-Made Industrial Diamond, a trademark of GE). The mixture is shaken and evenly distributed. The mixture has a measured effective thermal conductivity of 1 W/m/K. The addition of the diamond powder increases the sorption medium's effective thermal conductivity to 1 W/m/K from 0.2 to 0.3 W/m/K as measured without the diamond powder.

Adjacent to the two process microchannels are two coolant microchannels each 0.51 mm height, 3.05 cm width, and 4.45 cm length, with a combined internal volume of 1.38 $cm^3$. A water (50%)/propylene glycol (50%) mixture is the cooling fluid, which is maintained at 25° C. and a flow rate of 7.5 L/min during the cooling portion of the cycle. The coolant is cycled out of phase with the resistance heater, such that the coolant flow is on during the off cycle of the resistance heater.

Figure 14:
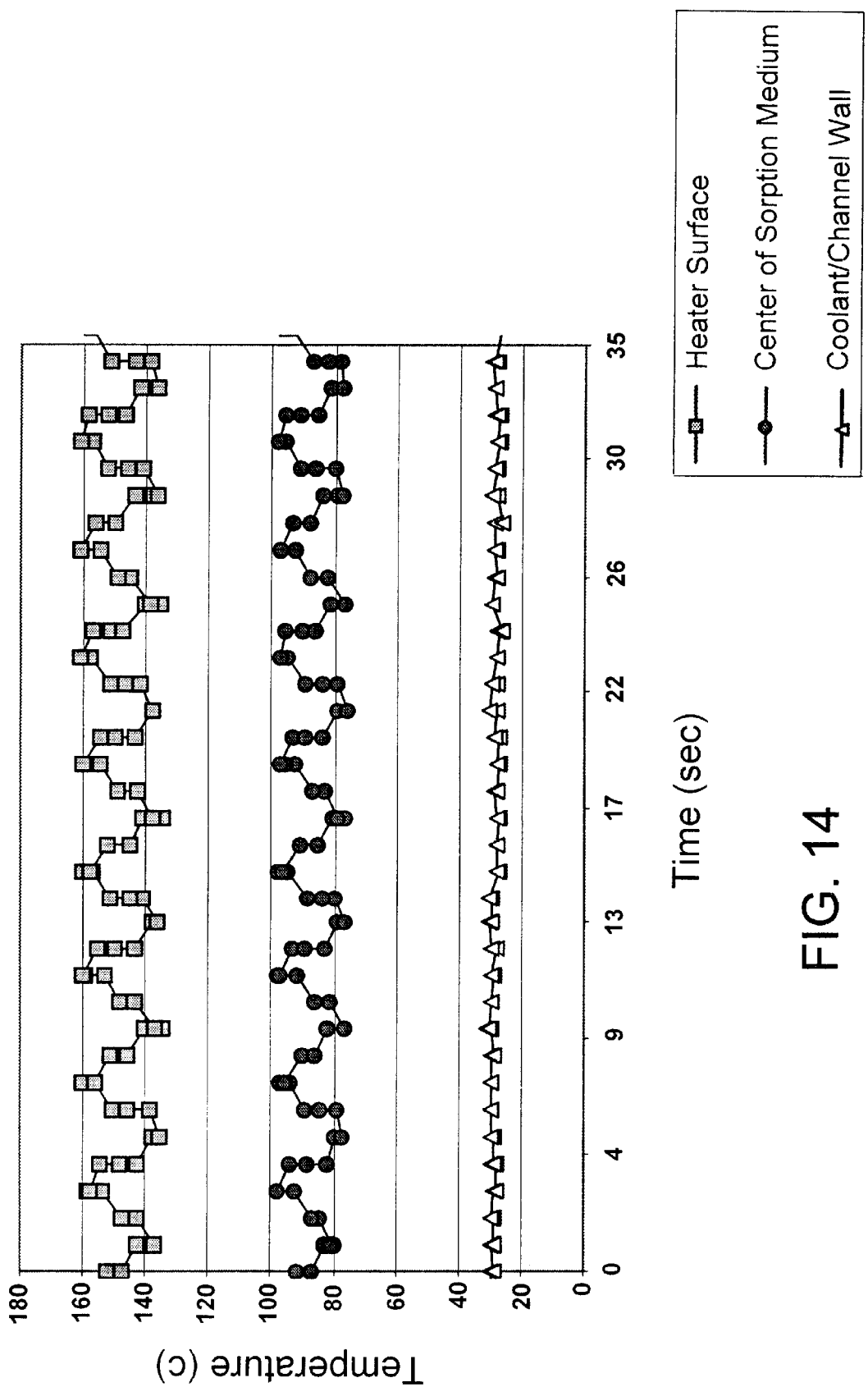
FIG. 14 is a plot of temperature versus time observed for the process disclosed in Example 4.

The cycle time of heating and cooling is varied. FIG. 14 shows the temperature of the sorption medium, heater surface, and coolant channel wall. At a 4 second cycle time (2 seconds heating and 2 seconds cooling), the sorption medium is heated and cooled 20° C. between 80 and 100° C.

The coolant side consists of two microchannels flanking the two process microchannels, each separated from its adjacent sorption medium by a 0.102 cm thick copper wall. The coolant microchannels enter and exit through a single header and a single footer. The header is a triangular-shaped channel with the coolant entrance at the large end of the triangle. The header is 0.594 cm thick and covers both microchannels. Its length is 4.572 cm, and its width at the base is 0.617 cm, with a corresponding volume of 0.838 cm$^3$. Header volume is 60.8% of the coolant channel volume. Average residence time in the header is 0.11 millisecond. The footer is identical to the header, where the coolant exit is at the base of the triangle. It is however oriented in a direction opposite that of the header, for a z-type flow pattern through the coolant channels. Footer volume is 60.8% of the coolant channel volume. Residence time in the footer is 0.11 millisecond. Residence time in the coolant channel is 0.18 millisecond.

In an alternate embodiment, the header and footer may be triangular over each process microchannel. In such case, header volume may be about 20% or less of coolant channel volume. The average residence time in the header may be about 0.04 millisecond. The same relations apply to the footer.

During sorption and desorption of oxygen, the total air and flush fluid residence time in the headers and footers may be less than 40% of the residence time in process microchannels. The headers and footers may have a volume of less than 40% of the volume of the microchannels where sorption occurs.

EXAMPLE 5

The enthalpy and entropy changes for $O_2$ sorption by meso-tetra($\alpha,\alpha,\alpha,\alpha$-o-pivalamidophenyl)porphyrin iron(II), are −15.6 kcal/mole and −38 cal/deg-mole, respectively. The $K_{eq}$ for a specific temperature is calculated from $\Delta G = \Delta H - T \Delta S$, where T is in degrees Kelvin, when combined with $\Delta G = -RT\ln K_{eq}$. For example, at 20° C. the values are $K_{eq}$=2400 atm$^{-1}$, and $P^{1/2}$=0.31 torr ($P^{1/2}$=1/$K_{eq}$), where $P^{1/2}$ is the pressure where one half of the sorption medium sites are filled with $O_2$ molecules at a particular temperature. The following data is evaluated:

| ln $K_{eg}$ | Temperature | $P^{1/2}$ | |
|---|---|---|---|
| Ln (atm$^{-1}$) | ° C. | Atm | psia |
| 5.34 ± 0.02 | 50.0 | 0.004796 | 0.07050 |
| 6.25 ± 0.05 | 37.0 | 0.001931 | 0.02838 |
| 7.56 ± 0.02 | 25.0 | 0.000521 | 0.00766 |
| 7.78 ± 0.13 | 20.0 | 0.000417 | 0.00613 |
| 9.76 ± 0.13 | −0.1 | 5.77E-05 | 0.00085 |

This data may be fitted by linear least squares using Sigma Plotsoftware to generate the relationship Log$_{10}$P$^{1/2}$=0.0387*T−4.2079 for which R$^2$=0.9947 and T is in ° C. and P is in atmospheres, or Log$_{10}$P$^{1/2}$=0.0387*T−3.0406 for which R$^2$=0.9947 and T is in ° C. and P is in pounds per square inch absolute (psia).

The second equation above is used to calculate a series of log$_{10}$P$^{1/2}$ values in the temperature range of interest. These values are listed in Table 1 below and plotted in FIG. 15. These equations or the straight line plot constitutes the "working curve" of the inventive process since information can be extracted from it which is needed for purified $O_2$ production, process modeling, and associated microchannel device design.

An example of using the data plotted in the FIG. 15 and Table 1 below to model the inventive process follows. Since the partial pressure of $O_2$ in air at sea level is 0.21 atm, the sorption medium loads nearly 100% of capacity with $O_2$ at 20° C. since this sorption medium only requires 4.08×10$^{-4}$ atm $O_2$ partial pressure to load it to 50% of capacity at 20° C. The fraction of sorption medium loading by $O_2$, q, is then calculated from P$^{1/2}$ as follows, $$\theta/(1-\theta)=P_{O2}/P^{1/2}=(0.21 \text{ atm})/[(10^{-2.2692}\text{psia})/(14.7 \text{ psia/atm})]=573.8$$

giving $\theta$=0.998 or that the sorption medium is loaded to 99.8% of capacity. Therefore at a $P_{O2}$ of 0.21 atmosphere equilibrium pressure at 20° C. temperature, the sorption medium is 99.8% loaded.

Figure 15:
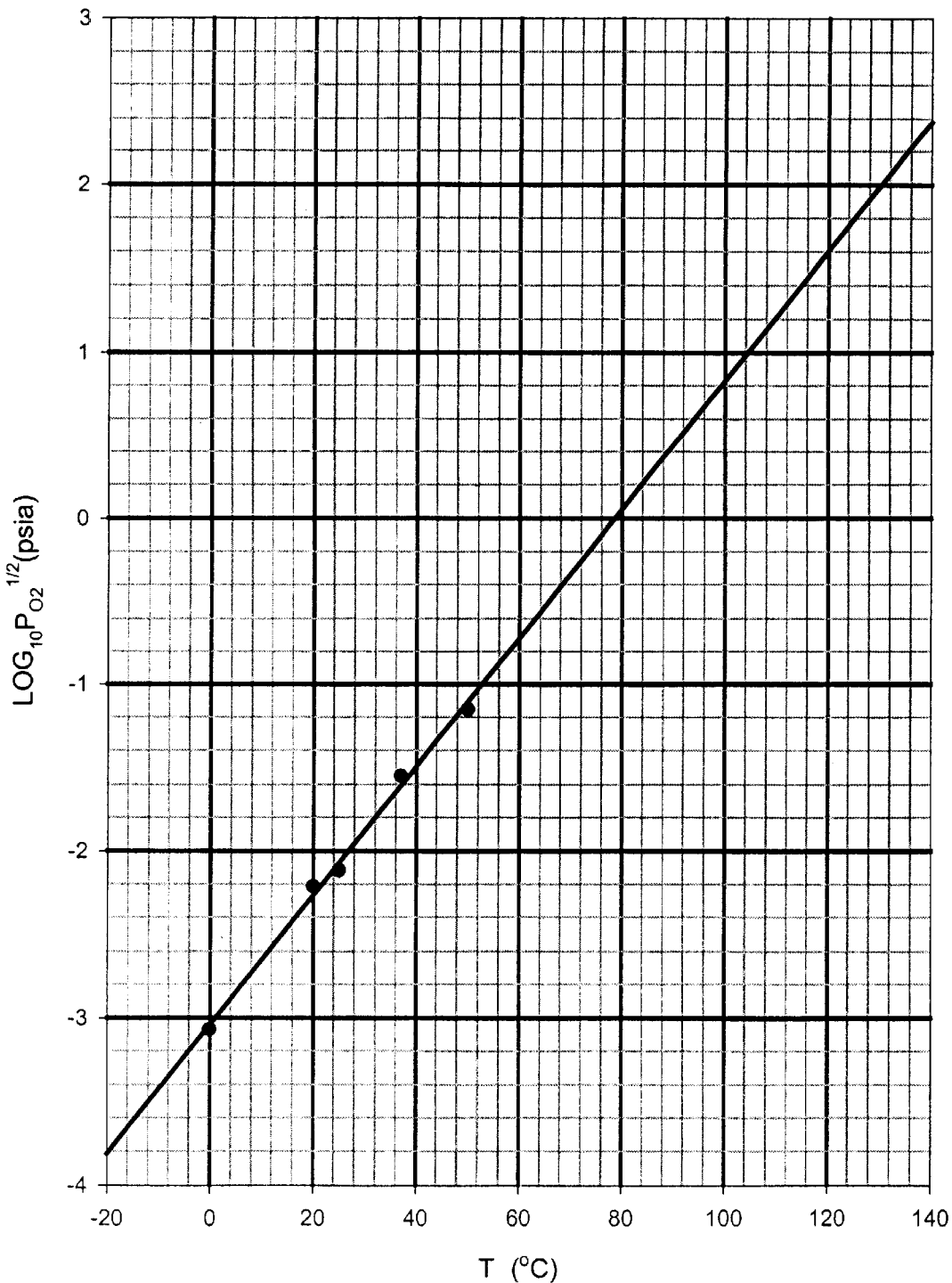
FIG. 15 is a plot of $\text{Log}_{10} P_{O2}^{1/2}$ (psia) versus temperature for the process disclosed in Example 5.

To use this loaded material described above with the inventive process to produce 6.8 atm of chemically pressurized and pure $O_2$ product, the information in the Table 1 and FIG. 15 is used to determine the temperature jump needed as follows. An approximate temperature of desorption is taken from FIG. 15 by reading the temperature for log P$^{1/2}$ for log (99.7), or a "y" value of 2.00, which is 130° C. For this example, a temperature jump of 130−20=110° C. is needed to produce 85 psig purified $O_2$ gas using air feed at 1 atm and 20° C.

Small temperature cycling ranges are desirable for the inventive process since the process requires cycling the temperature of the sorption medium and its container mass, which determines the amount of energy needed to achieve the change in temperature, and the rate of temperature change for a given available heat flux. Minimal temperature jump ranges may be determined from the above equations for the specific sorption medium of this example in the following manner. Since the 20° C. loading is desirable, the sorption medium can be fully loaded at higher temperatures than 20° C.

The calculations to use these temperature effects of the inventive process are as follows, Using the equations:

$$\theta/(1-\theta)=P_{O2}/P^{1/2}$$

$$\text{Log}_{10}P^{1/2}=0.0387*T-3.0406$$

With input parameters of $T_1$=loading/sorbing temperature ($T_{sorb}$)
$T_2$=unloading/desorption temperature ($T_{desorb}$)
$P^{T1}_{O2}$=0.21 atm=3.09 psia
$P^{T2}_{O2}$=99.7 psia Solving two equations and two unknowns, first the two P$^{1/2}$ values, log$_{10}$P$^{1/2}_{T1}$ and log$_{10}$P$^{1/2}_{T2}$, are calculated. For the above input parameters, these are determined to be −0.465 and +2.95 respectively (psia units). Then the two temperatures are calculated as follows, $$T_{sorb}=66.6° \text{ C.}$$

$$T_{desorb}=154.9° \text{ C.}$$

The temperature jump required to effect the above sorbent loading changes with production of purified and pressurized $O_2$, is the difference between these two temperatures, or 88.3° C.

Temperature changes of 40° C., and in one embodiment 20° C. or less may be desirable. Smaller temperature jumps merely indicate that the sorption medium is left with some $O_2$ not desorbed during the cycle. In one embodiment, the sorption medium is fully loaded during the sorption cycle, and is fully or only partially desorbed during the desorption cycle, as is afforded by the temperatures and temperature jump cycles chosen to practice the invention.

TABLE 1

| Temperature (° C.) | $Log_{10} P^{1/2}$ (log psia) |
|---|---|
| −0.1000 | −3.0447 |
| 0.9020 | −3.0059 |
| 1.9040 | −2.9671 |
| 2.9060 | −2.9283 |
| 3.9080 | −2.8896 |
| 4.9100 | −2.8508 |
| 5.9120 | −2.8120 |
| 6.9140 | −2.7733 |
| 7.9160 | −2.7345 |
| 8.9180 | −2.6957 |
| 9.9200 | −2.6569 |
| 10.9220 | −2.6182 |
| 11.9240 | −2.5794 |
| 12.9260 | −2.5406 |
| 13.9280 | −2.5019 |
| 14.9300 | −2.4631 |
| 15.9320 | −2.4243 |
| 16.9340 | −2.3855 |
| 17.9360 | −2.3468 |
| 18.9380 | −2.3080 |
| 19.9400 | −2.2692 |
| 20.9420 | −2.2304 |
| 21.9440 | −2.1917 |
| 22.9460 | −2.1529 |
| 23.9480 | −2.1141 |
| 24.9500 | −2.0754 |
| 25.9520 | −2.0366 |
| 26.9540 | −1.9978 |
| 27.9560 | −1.9590 |
| 28.9580 | −1.9203 |
| 29.9600 | −1.8815 |
| 30.9620 | −1.8427 |
| 31.9640 | −1.8040 |
| 32.9660 | −1.7652 |
| 33.9680 | −1.7264 |
| 34.9700 | −1.6876 |
| 35.9720 | −1.6489 |
| 36.9740 | −1.6101 |
| 37.9760 | −1.5713 |
| 38.9780 | −1.5325 |
| 39.9800 | −1.4938 |
| 40.9820 | −1.4550 |
| 41.9840 | −1.4162 |
| 42.9860 | −1.3775 |
| 43.9880 | −1.3387 |
| 44.9900 | −1.2999 |
| 45.9920 | −1.2611 |
| 46.9940 | −1.2224 |
| 47.9960 | −1.1836 |
| 48.9980 | −1.1448 |
| 50.0000 | −1.1060 |
| 60.0000 | −0.7191 |
| 70.0000 | −0.3322 |
| 80.0000 | 0.0548 |
| 90.0000 | 0.4417 |
| 100.0000 | 0.8287 |
| 110.0000 | 1.2156 |
| 120.0000 | 1.6026 |
| 122.0000 | 1.6800 |
| 124.0000 | 1.7574 |
| 126.0000 | 1.8348 |
| 128.0000 | 1.9122 |
| 130.0000 | 1.9895 |
| 132.0000 | 2.0669 |
| 132.5000 | 2.0863 |
| 133.0000 | 2.1056 |

EXAMPLE 6

The inventive process is used to effect an oxygen separation using the apparatus described in Example 4. Ten process microchannels are interspersed between eleven coolant microchannels. All microchannel dimensions are identical to those described in Example 4. An overall cycle time of 4 seconds is used, where the feed time for sorption is 2 seconds and the feed time for desorption is 2 seconds. The sorption medium is cycled between 80 and 100° C. to sorb and desorb oxygen, respectively.

A feature of the design used in this example relates to the header and footer that connects to the feed valve and the valve or valves at the end of the stage that send the effluent stream to either exhaust or product recovery. After the feed valve, a cylindrical pipe connects the flow to the ten process microchannels. The sorption medium has a resistance heating element set between and flanked by two process microchannels. Coolant microchannels are on the outer sides of the process microchannels. The inner diameter of the cylindrical pipe is 2.54 mm and the flow length is 35 mm to give a total volume of about 0.7 cc. Connected to the pipe is a triangular header that brings flow to each of the ten sorption medium beds. The triangular connection has a base equal to the process microchannel sorption medium gap plus resistance heater (1.45 mm) and width of 2.39 cm. The distance from the tangent of the circular connection pipe to the entrance of the sorption medium bed is 6.35 mm. The triangular header is at a 45 degree angle. The total header volume for each process microchannel is 0.11 cc. The total dead volume of ten headers and connection pipe from the feed valve is 1.8 cc. The total volume of the ten process microchannels is 13.3 cc. The percentage of volume in the header system is roughly 13% of the total sorption medium volume. The footer design is similar to the header.

The flowrate of air through the system is 10 liters per minute at 25° C. and 1 atm. The average residence time in the process microchannel sorption medium beds is 80 milliseconds. The average residence time in the header system is 6 milliseconds. The average residence time in the footer is slightly longer as the oxygen is sorbed in the process microchannel sorption medium beds.

The air feed is cycled between two alternate microchannel arrays of sorption medium beds. Oxygen is sorbed during one stage and then desorbed during the second stage. For a 2 second cycle time, 6 milliseconds is spent flushing purge fluids from the header and slightly longer purging the footer.

The flow of the purge fluid during the desorption cycle is less than the air feed during the feed cycle. The purge fluid is oxygen or steam. For the case of steam, the pressure may be higher than the sorption pressure. For a purge fluid of steam, a higher desorption temperature is required to prevent condensation of the water. For the case of the purge fluid flowing at 1 liter per minute, the average residence time in the header system is 0.06 seconds. The average residence time in the footer is 0.06 seconds or slightly less as the oxygen is desorbed. The average residence time in the process microchannel sorption medium bed array is approximately 0.8 seconds.

Resistance heat is used to heat the sorbent bed and the coolant fluid described in Example 4 is used to cool the sorbent bed.

While the invention has been explained in relation to various detailed embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for separating a fluid component from a fluid mixture comprising the fluid component, the process comprising:
   (A) flowing the fluid mixture into a microchannel separator; the microchannel separator comprising a plurality of process microchannels containing a sorption medium, a header providing a flow passageway for fluid to enter the process microchannels, and a footer providing a flow passageway for fluid to leave the process microchannels, the combined internal volume of the header and the footer being up to about 40% of the internal volume of the process microchannels; the fluid mixture being maintained in the microchannel separator until at least part of the fluid component is sorbed by the sorption medium; purging the microchannel separator to displace non-sorbed parts of the fluid mixture from the microchannel separator; and
   (B) desorbing the fluid component from the sorption medium and flowing a flush fluid through the microchannel separator to displace the desorbed fluid component from the microchannel separator.

2. The process of claim 1 wherein an inlet line is connected to the header and an outlet line is connected to the footer; the inlet line having separate entries for the fluid mixture and the flush fluid, the entry for the flush fluid being upstream of the entry for the fluid mixture; the outlet line having separate outlets for the fluid mixture and the flush fluid, the outlet for the flush fluid being upstream of the outlet for the fluid mixture.

3. The process of claim 1 wherein the header is comprised of a flexible member to permit changing the internal volume of the header.

4. The process of claim 1 wherein the footer is comprised of a flexible member to permit changing the internal volume of the footer.

5. The process of claim 1 wherein the header and the footer are each comprised of flexible members to permit changing the internal volume of the header and the footer.

6. The process of claim 1 wherein the header is a multiple entry header which comprises a fluid mixture section, a purging fluid section, and a flush fluid section; the fluid mixture flows from the fluid mixture section into the process microchannels; a purging fluid flows from the purging fluid section into the process microchannels; and the flush fluid flows from the flush fluid section into the process microchannels.

7. The process of claim 1 wherein the flush fluid is different than the fluid component and the process further comprises separating the flush fluid from the fluid component.

8. The process of claim 1 wherein during step (B) the flush fluid flows from the header to the process microchannels, through the process microchannels to the footer.

9. The process of claim 1 wherein during step (B) the flush fluid flows from the footer to the process microchannels, through the process microchannels to the header.

10. The process of claim 1 wherein the process further comprises the step of regenerating the sorption medium subsequent to step (B).

11. The process of claim 1 wherein the sorption medium is at a first temperature during step (A) and a second temperature during step (B), the first temperature being lower than the second temperature.

12. The process of claim 1 wherein the sorption medium is at a first temperature during step (A) and a second temperature during step (B), the first temperature being higher than the second temperature.

13. The process of claim 1 wherein the sorption medium is at a first temperature at the beginning of step (A) and a second temperature at the end of step (A), the first temperature being higher than the second temperature.

14. The process of claim 1 wherein the sorption medium is under a first pressure during step (A) and under a second pressure during step (B), the first pressure being equal to or higher than the second pressure.

15. The process of claim 1 wherein the sorption medium is under a first pressure during step (A) and under a second pressure during step (B), the first pressure being equal to or lower than the second pressure.

16. The process of claim 1 wherein the sorption medium is at a first temperature and under a first pressure during step (A) and a second temperature and second pressure during step (B), the first temperature being lower than the second temperature, and the first pressure being equal to or higher than the second pressure.

17. The process of claim 1 wherein the sorption medium is at a first temperature and under a first pressure during step (A) and a second temperature and second pressure during step (B), the first temperature being lower than the second temperature, and the first pressure being equal to or lower than the second pressure.

18. The process of claim 1 wherein the sorption medium is heated using a resistance heater.

19. The process of claim 1 wherein the sorption medium comprises a metal structure that functions as a resistance heater.

20. The process of claim 1 wherein the sorption medium is heated using heat from heat exchange microchannels in thermal contact with the sorption medium.

21. The process of claim 20 wherein fluid flowing through the process microchannels flows in a first direction, and a heat exchange fluid flows through the heat exchange microchannels in a second direction, the second direction being cross current relative to the first direction.

22. The process of claim 20 wherein fluid flowing through the process microchannels flows in a first direction, and a heat exchange fluid flows through the heat exchange microchannels in a second direction, the second direction being cocurrent relative to the first direction.

23. The process of claim 20 wherein fluid flowing through the process microchannels flows in a first direction, and a heat exchange fluid flows through the heat exchange microchannels in a second direction, the second direction being counter current relative to the first direction.

24. The process of claim 20 wherein the heat exchange microchannels are made of a material comprising: steel; aluminum; titanium; nickel; platinum; rhodium; copper; chromium; brass; an alloy of any of the foregoing metals; a polymer; ceramics; glass; a composite comprising polymer and fiberglass; quartz; silicon; or a combination of two or more thereof.

25. The process of claim 20 wherein the heat exchange microchannels have an internal dimension of width or height of up to about 2 mm.

26. The process of claim 1 wherein the process microchannels are made of a material comprising: steel; aluminum; titanium; nickel; platinum; rhodium; copper; chromium; brass; an alloy of any of the foregoing metals; a polymer; ceramics; glass; a composite comprising a polymer and fiberglass; quartz; silicon; or a combination of two or more thereof.

27. The process of claim 1 wherein the sorption medium is in the form of a flow-by sorption medium.

28. The process of claim 1 wherein the sorption medium is in the form of a flow-through sorption medium.

29. The process of claim 1 wherein the process microchannels have interior surfaces and the sorption medium is coated on the interior surfaces of the process microchannels.

30. The process of claim 1 wherein the sorption medium is in the form of particulate solids.

31. The process of claim 1 wherein the sorption medium is in the form of particulate solids which are mixed with an effective amount of heat conductive particulate solids to increase the thermal conductivity of the sorption medium.

32. The process of claim 1 wherein the sorption medium is in the form of a foam, felt, wad, gauze, honeycomb, insertable fin, or a combination of two or more thereof.

33. The process of claim 32 wherein the foam, felt, wad, gauze or insertable fin functions as a resistance heater.

34. The process of claim 1 wherein the sorption medium has a serpentine configuration.

35. The process of claim 1 wherein the sorption medium is in the form of a flow-by structure with an adjacent gap, a foam with an adjacent gap, a fin structure with gaps, a washcoat on an inserted substrate, or a gauze that is parallel to the flow direction with a corresponding gap for flow.

36. The process of claim 1 wherein the sorption medium occupies about 1 to about 99 percent of the cross sectional area of at least one cross section of the process microchannel.

37. The process of claim 1 wherein the sorption medium comprises silver, gold, platinum, palladium, nickel, zeolite, silica gel, or a combination of two or more thereof.

38. The process of claim 1 wherein the sorption medium is derived from Fe(II), Co(II), Cu(I), V(II), Mn(II), Mn(III), Cr(II), Ag(I), Rh(I), Rh(II), Rh(III), U(IV), V(IV), Ru(II), Ru(IV), Ti(III), Cr(IV), Bi(III), Ni(II), W(V), W(IV), Mo(II), Mo(III), Mo(IV), Mo(V), Mo(VI), or a combination of two or more thereof.

39. The process of claim 1 wherein the sorption medium is derived from: dipyridyl; 2,6-[1-(2-imidazol4-ylethylimino) ethyl pyridine]; cyclen; cyclam; a Schiff base ligand; acetyl acetonate or an oligomer or polymer thereof; a carboxylate; bipyridyl or an oligomer or polymer thereof; a porphyrin or an oligomer or polymer thereof; a corin or an oligomer or polymer thereof; a polyamide; a protein; 8-hydroxy quinoline or an oligomer or polymer thereof; ethyl cysteinate or an oligomer or polymer thereof; an N-alkyl alkanohydroxamic acid; dimethylglyoxime; sym-diethylethylenediamine; or a combination of two or more thereof.

40. The process of claim 1 wherein the sorption medium is derived from an imidazole, histidine amino acid, pyridine, piperidine, 4-methyl aminopyridine, 4-dimethyl aminopyridine, a nitrate, a thiocyanate, a halide, or a combination of two or more thereof.

41. The process of claim 1 wherein the sorption medium comprises: hemoglobin; hemoerythyrin; hemocyanin; myoglobin; Co(II) (acacen); Co(II) (dry cave) (N-methyl imidazole); Fe(II) (H2TpivPP)B; Fe(II)(capped porphyrin) B; Fe(ophen)$_2^{2+}$; bis(ethyl cysteinato) oxovanadium (IV); Cu(I) (bimp); bis(dimethylglyoximato)cobalt(II); bis(histidine)cobalt(II); dinitrato-bis(sym-diethylethylenediamine)cobalt(II); dichloro-bis(sym-diethylethylenediamine)cobalt(II); [m-tetra(a, (α,α,α,α-o-pivalamidophenyl)porphyrin]cobalt(II);[N,N-bis(salicylidene)dipropylenetriamine]cobalt(II); [2,3,10,11,13,19-hexamethyl-3,10,14,18,21,25-hexaazabicyclo[10.7.7] hexacosa-1,11,13,18,20,25-hexene-κ$^{-4}$N)cobalt(II) hexafluorophosphate;[N,N'-bis(salicylicylidene) ethylenediamine]cobalt(II); [N,N'-bis(3-methoxysalicylicylidene)ethylenediamine]cobalt(II);[N,N'-bis(salicylicylidene)tetramethylethylenediamine]cobalt(II); [N,N'-bis(3-methoxysalicylicylidene) tetramethylethylenediamine]cobalt(II); [N,N'-bis(3-isoprpoxysalicylicylidene)tetramethylethylenediamine] cobalt(II); [N,N'-bis(3-ethoxysalicylicylidene) tetramethylethylenediamine]cobalt(II);[N,N'-bis(5-methoxysalicylicylidene)tetramethylethylenediamine] cobalt(II); [N,N'-bis(5-n-butoxysalicylicylidene) tetramethylethylenediamine]cobalt(II); [N,N'-bis (salicylidene)ethylenediamine]cobalt(II)); a cobalt (II) porphyrin complex; a metal-cyanide complex encapsulated within a zeolite; a cyanocobaltate; hemoglobin, hemerythrin or hemocyanin containing a diiron(III,IV), dicopper(II) or dimanganese core; N,N'-disalicylideneethylenediamine cobalt(II); cobalt di-(3-methoxysalicylal tertbutylamine); [N,N'-bis(salicylidene)n-propyldipropylenetriamine]cobalt (II); 1-methylimidazole; 2-methylimidazole; 4-dimethylaminopyridine; cyanopyridine; cobalt chelated copolymer derived from ethylene-diamine-tetraacetic acid, methyl methacrylate and butyl acrylate; bis(histidine) cobalt (II); [α-mono(o-methacrylamidophenyl)-α,α,α-tris(o-pivalamidophenyl)porphinato]cobalt; [meso-α,α,α,α-tetrakis(o-pivalamidophenyl)porphinato]-iron(II); cobalt(II) meso-tetra-phenyl-porphyrin; cobalt(II) meso-tetrakis(2-chlorophenyl) prophyrin; cobalt(II) meso-tetrakis(4-chlorophenyl) porphyrin; cobalt(II) meso-tetrakis(4-methoxy phenyl) porphyrin; cobalt(II) meso-tetrakis(2,4-dimethoxy phenyl) porphyrin; ruthenium (III) bis (salicylaldehyde)ethylenediimine; ruthenium (III) bis (salicylaldehyde)diethlenetriimine; ruthenium (III) bis (picolinaldehyde)-o-phenylenediimine; ruthenium (III) bis (picolinaldehyde)ethylenediimine; ruthenium (II) bis (picolinaldehyde)diethylenetriimine; bis (dimethylglyoximato)nickel(II); bis(dimethylglyoximato) cobalt(II); bis(dimethylglyoximato)copper(II); dinitrato-bis (sym-diethylenediamine)cobalt(II); dithiocyanato-bis(sym-diethylethelenediamine)cobalt(II); dichloro-bis(sym-diethylethylenediamine)cobalt(II); cobalt di-(salicylal)-3,3'-diimino-di-n-propylamine; N,N'-disalicyclidene ethylene diamine cobalt (II); N,N'-ethylene-bis(5-nitro-salicyliden-iminato) cobalt(II), or a combination of two or more thereof.

42. The process of claim 1 wherein the sorption medium is derived from a ligand having the structure illustrated in FIG. 16 wherein each R represents a hydrocarbon or substituted hydrocarbon group.

43. The process of claim 1 wherein the sorption medium comprises $Sb_2O_5$, AgO, PtO, $CrO_2$, PbO, HgO, $Cu_2O$, MnO, $Mn_2O_3$, $Bi_2O_4$, NiO, $NiO_2$, $Cu_2O_3$, SnO, $SnO_2$, $WO_2$, $WO_3$, $W_2O_5$, perfluorinated film, Pt/γ-alumina, Fe/γ-alumina, Cu/γ-alumina, Zn/γ-alumina, Co/γ-alumina, zeolite, or a combination of two or more thereof.

44. The process of claim 1 wherein the sorption medium comprises a metal cyanide oligomer or polymer.

45. The process of claim 44 wherein the metal cyanide oligomer or polymer is represented by the formula $[Cu(I)(CN)_x]_n$, $[Fe(ii)(CN)_y]_n$ or $[Co(II)(CN)_y]_n$, wherein x is 3, y is 5 and n is a number that is at least 2.

46. The process of claim 1 wherein the sorption medium comprises silica gel, foamed copper, sintered stainless steel fiber, alumina, poly(methyl methacrylate), polysulfonate, poly(tetrafluoroethylene), iron, nickel sponge, nylon, polyvinylidene difluoride, polypropylene, polyethylene, polyethylene ethylketone, polyvinyl alcohol, polyvinyl acetate, polyacrylate, polymethylmethacrylate, polystyrene, polyphenylene sulfide, polysulfone, polybutylene, or a combination of two or more thereof.

47. The process of claim 1 wherein the sorption comprises an antioxidant.

48. The process of claim 47 wherein the antioxidant comprises a secondary amine, phenolic phosphate, phosphite, phenolic, bisphenolic, hydroxylamine, olefinic carboxylate, amino carboxylate, tocopherol, di-tertiarybutyl-p-cresol, stannous salt, stannous oxide, sorbate, polysorbate, or a combination of two or more thereof.

49. The process of claim 1 wherein the sorption medium comprises a deposit derived from methane and hydrogen.

50. The process of claim 1 wherein the process microchannels have an internal dimension of width or height of up to about 10 mm.

51. The process of claim 1 wherein the fluid mixture in step (A) is non-condensed, at least about 1% by volume of the fluid component sorbed during step (A) is desorbed during step (B), the time to complete steps (A) and (B) being up to about 100 seconds.

52. The process of claim 1 wherein the fluid mixture in step (A) is condensed, at least about 10% by volume of the fluid component sorbed during step (A) is desorbed during step (B), the time to complete steps (A) and (B) being up to about 100 seconds.

53. The process of claim 1 wherein the sorption medium is at a temperature in the range of about −100 to about 200° C. during step (A), and about 0 to about 300° C. during step (B).

54. The process of claim 1 wherein the sorption medium is under a pressure in the range of about 0.01 to about 50 atmospheres during step (A), and about 0.001 to about 50 atmospheres during step (B).

55. The process of claim 1 wherein the fluid mixture comprises air and the fluid component comprises oxygen.

56. The process of claim 1 wherein the fluid mixture comprises a paraffin and an olefin, and the fluid component comprises the olefin.

57. The process of claim 1 wherein the fluid mixture comprises ethylene and ethane, and the fluid component comprises ethylene.

58. The process of claim 1 wherein the fluid component comprises oxygen, hydrogen, $NO_x$, CO, $CO_2$, $H_2S$, HCN, $SO_2$, $CH_3SCH_3$, an olefin, a paraffin, an aromatic compound, a halogenated compound, a nitrate, a sulfate, a sugar, an ester, an alcohol, an ether, or a mixture of two or more thereof.

59. The process of claim 1 wherein the purging fluid comprises nitrogen, helium, argon, carbon dioxide, water vapor, or a mixture of two or more thereof.

60. The process of claim 1 wherein the flush fluid comprises nitrogen, helium, argon, carbon dioxide, water vapor, or a mixture of two or more thereof.

61. A process for separating oxygen from air comprising:
(A) flowing the air into a microchannel separator; the microchannel separator comprising a plurality of process microchannels containing a sorption medium, a header providing a flow passageway for fluid to enter the process microchannels, and a footer providing a flow passageway for fluid to leave the process microchannels, the combined internal volume of the header and the footer being up to about 40% of the internal volume of the process microchannels; the air being maintained in the microchannels separator until at least part of the oxygen is sorbed by the sorption medium; purging the microchannel separator to displace non-sorbed parts of the air from the microchannel separator; and (B) desorbing oxygen from the sorption medium and flowing a flush fluid through the microchannel separator to displace the desorbed oxygen from the microchannel separator.

62. A process for separating a fluid component from a fluid mixture comprising the fluid component, the process comprising:
(I)(A) flowing part of the fluid mixture into a first microchannel separator; the first microchannel separator comprising a plurality of first process microchannels containing a first sorption medium, a first header providing a flow passageway for fluid to enter the first process microchannels, and a first footer providing a flow passageway for fluid to leave the first process microchannels, the combined internal volume of the first header and the first footer being up to about 40% of the internal volume of the first process microchannels; the fluid mixture being maintained in the first microchannel separator until at least part of the fluid component is sorbed by the first sorption medium; purging the first microchannel separator to displace non-sorbed parts of the fluid mixture from the first microchannel separator;

(I)(B) desorbing the fluid component from the first sorption medium and flowing a first flush fluid through the first microchannel separator to displace the desorbed fluid component from the first microchannel separator;

(II)(A) flowing another part of the fluid mixture into a second microchannel separator; the second microchannel separator comprising a plurality of second process microchannels containing a second sorption medium, a second header providing a flow passageway for fluid to enter the second process microchannels, and a second footer providing a flow passageway for fluid to leave the second process microchannels, the combined internal volume of the second header and the second footer being up to about 40% of the internal volume of the second process microchannels; the fluid mixture being maintained in the second microchannel separator until at least part of the fluid component is sorbed by the second sorption medium; purging the second microchannel separator to displace non-sorbed parts of the fluid mixture from the second microchannel separator; and (II)(B) desorbing the fluid component from the second sorption medium and flowing a second flush fluid through the second microchannel separator to displace the desorbed fluid component from the second microchannel separator.

63. The process of claim 62 wherein step (I)(A) is conducted at the same time that step (II)(B) is conducted.

64. The process of claim 62 wherein step (I)(B) is conducted at the same time that step (II)(A) is conducted.

65. A process for separating a first fluid component from a second fluid component, the first fluid component and the second fluid component being contained in a first fluid mixture, the process comprising:
(I) mixing the first fluid mixture with a third fluid component to form a second fluid mixture;
(II) separating the second fluid mixture into a third fluid mixture and a fourth fluid mixture, the third fluid mixture comprising the first fluid component and the third fluid component, the fourth fluid mixture comprising the second fluid component and the third fluid component:
(III)(A) flowing the third fluid mixture into a first microchannel separator; the first microchannel separator comprising a plurality of first process microchannels containing a first sorption medium, a first header providing a flow passageway for fluid to enter the first process microchannels, and a first footer providing a flow passageway for fluid to leave the first process microchannels, the combined internal volume of the first header and the first footer being up to about 40% of the internal volume of the first process microchannels; the third fluid mixture being maintained in the first microchannel separator until at least part of the first fluid component is sorbed by the first sorption medium; purging the first microchannel separator to displace non-sorbed parts of the third fluid mixture from the first microchannel separator;

(III)(B) desorbing the first fluid component from the first sorption medium and flowing a first flush fluid through the first microchannel separator to displace the desorbed first fluid component from the first microchannel separator;

(IV)(A) flowing the fourth fluid mixture into a second microchannel separator; the second microchannel separator comprising a plurality of second process microchannels containing a second sorption medium, a second header providing a flow passageway for fluid to enter the second process microchannels, and a second footer providing a flow passageway for fluid to leave the second process microchannels, the combined internal volume of the second header and the second footer being up to about 40% of the internal volume of the second process microchannels; the fourth fluid mixture being maintained in the second microchannel separator until at least part of the second fluid component is sorbed by the second sorption medium; purging the second microchannel separator to displace non-sorbed parts of the fourth fluid mixture from the second microchannel separator; and (IV)(B) desorbing the second fluid component from the second sorption medium and flowing a second flush fluid through the second microchannel separator to displace the desorbed second fluid component from the second microchannel separator.

66. The process of claim 65 wherein the first fluid component comprises an olefin and the second fluid component comprises a paraffin.

67. The process of claim 65 wherein the first fluid component comprises ethylene and the second fluid component comprises ethane.

68. A process for separating a fluid component from a fluid mixture comprising the fluid component, the process comprising:

(I)(A) flowing the fluid mixture into a first microchannel separator; the first microchannel separator comprising a plurality of first process microchannels containing a first sorption medium, a first header providing a flow passageway for fluid to enter the first process microchannels, and a first footer providing a flow passageway for fluid to leave the first process microchannels, the combined internal volume of the first header and the first footer being up to about 40% of the internal volume of the first process microchannels; the fluid mixture being maintained in the first microchannel separator until at least part of the fluid component is sorbed by the first sorption medium; removing non-sorbed parts of the fluid mixture from the first microchannel separator;

(I)(B) desorbing the fluid component from the first sorption medium and flowing a first flush fluid through the first microchannel separator to displace the desorbed fluid component from the first microchannel separator;

(II)(A) flowing the non-sorbed part of the fluid mixture removed from the first microchannel separator during step (I)(A) into a second microchannel separator; the second microchannel separator comprising a plurality of second process microchannels containing a second sorption medium, a second header providing a flow passageway for fluid to enter the second process microchannels, and a second footer providing a flow passageway for fluid to leave the second process microchannels, the combined internal volume of the second header and the second footer being up to about 40% of the internal volume of the second process microchannels; the non-sorbed part of the fluid mixture being maintained in the second microchannel separator until at least part of the fluid component is sorbed by the second sorption medium; purging the second microchannel separator to displace non-sorbed parts of the fluid mixture from the second microchannel separator; and (II)(B) desorbing the fluid component from the second sorption medium and flowing a second flush fluid through the second microchannel separator to displace the desorbed fluid component from the second microchannel separator.

* * * * *